(12) United States Patent
Miki et al.

(10) Patent No.: US 8,920,601 B2
(45) Date of Patent: Dec. 30, 2014

(54) METHOD OF DETACHING PLATES

(71) Applicant: Nitto Denko Corporation, Ibaraki (JP)

(72) Inventors: Kaori Miki, Ibaraki (JP); Masahito Niwa, Ibaraki (JP); Takahiro Nonaka, Ibaraki (JP); Masato Fujita, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 12 days.

(21) Appl. No.: 13/672,876

(22) Filed: Nov. 9, 2012

(65) Prior Publication Data

US 2013/0118692 A1 May 16, 2013

(30) Foreign Application Priority Data

Nov. 10, 2011 (JP) ................................. 2011-246877
Jan. 23, 2012 (JP) ................................. 2012-010896

(51) Int. Cl.
*B32B 38/00* (2006.01)
*B32B 43/00* (2006.01)

(52) U.S. Cl.
CPC ........... *B32B 43/006* (2013.01); *B32B 2315/08* (2013.01); *Y10S 156/924* (2013.01); *Y10S 156/941* (2013.01); *Y10S 156/943* (2013.01)
USPC ........... 156/718; 156/714; 156/715; 156/762; 156/763; 156/924; 156/941; 156/943; 156/711

(58) Field of Classification Search
USPC ........................................................ 156/711
See application file for complete search history.

(56) References Cited

U.S. PATENT DOCUMENTS

| 3,028,742 | A | * | 4/1962 | Hacker et al. ...................... 69/10 |
| 5,022,951 | A | * | 6/1991 | Behlmer et al. ............... 156/379 |
| 5,498,305 | A | * | 3/1996 | Mailloux ....................... 156/249 |
| 5,897,743 | A | * | 4/1999 | Fujimoto et al. ............... 156/750 |
| 6,123,800 | A | * | 9/2000 | Freund et al. .................. 156/765 |
| 6,227,276 | B1 | * | 5/2001 | Kim et al. ....................... 156/763 |
| 6,415,843 | B1 | * | 7/2002 | De et al. ........................ 156/750 |
| 6,746,564 | B2 | * | 6/2004 | Fujisaku et al. ............... 156/706 |
| 6,841,030 | B2 | * | 1/2005 | Sasada ........................... 156/701 |
| 7,097,903 | B2 | | 8/2006 | Kishioka et al. |
| 8,245,754 | B2 | * | 8/2012 | Fujita et al. ................... 156/764 |
| 8,261,804 | B1 | * | 9/2012 | Huang ........................... 156/762 |
| 8,376,017 | B2 | * | 2/2013 | Lee et al. ....................... 156/752 |
| 2003/0232192 | A1 | | 12/2003 | Kishioka et al. |
| 2004/0191509 | A1 | | 9/2004 | Kishioka et al. |
| 2007/0036953 | A1 | * | 2/2007 | Nonaka et al. ................ 428/209 |
| 2007/0119893 | A1 | * | 5/2007 | Rayssac et al. .................... 225/2 |
| 2007/0122926 | A1 | * | 5/2007 | Martinez et al. ................ 438/34 |
| 2011/0111220 | A1 | * | 5/2011 | Takarada et al. .............. 428/345 |
| 2011/0236682 | A1 | * | 9/2011 | Okamoto et al. ...... 428/355 CN |

FOREIGN PATENT DOCUMENTS

| JP | 2003-238915 A | 8/2003 |
| JP | 2003-342542 A | 12/2003 |
| JP | 2004-231723 A | 8/2004 |

* cited by examiner

*Primary Examiner* — Mark A Osele
*Assistant Examiner* — Nickolas Harm
(74) *Attorney, Agent, or Firm* — Edwards Wildman Palmer LLP

(57) ABSTRACT

Disclosed is a method for detaching two plates bonded through a double-coated pressure-sensitive adhesive sheet without substantially applying such a force (load) to the plates as to cause large distortion (deformation) leading to fracture or breakage of the plates. The method detaches two plates bonded through a double-coated pressure-sensitive adhesive sheet by applying a force to at least one of the two plates at least in a direction normal to the plate at such a temperature that the double-coated pressure-sensitive adhesive sheet has a storage elastic modulus of $1.0 \times 10^7$ Pa or more as measured by dynamic viscoelastic measurement.

8 Claims, 3 Drawing Sheets

(1a)

(1b)

(1c)

(1a)

(1b)

(1c)

METHOD OF DETACHING PLATES

TECHNICAL FIELD

The present invention relates to a method of detaching plates. Specifically, the present invention relates to a method of detaching two plates bonded through a double-coated pressure-sensitive adhesive sheet.

BACKGROUND ART

Liquid crystal displays (LCDs) and other display devices, as well as touch-screen panels and other input devices to be used in combination with the display devices, have been widely employed in various areas. Transparent pressure-sensitive adhesive sheets are used for the lamination of optical members to produce such display devices and input devices. For example, transparent pressure-sensitive adhesive sheets are used for the lamination of touch-screen panels or lenses with display devices (e.g., LCDs) (see, for example, Patent Literature (PTL) 1, PTL 2, and PTL 3).

CITATION LIST

Patent Literature

PTL 1: Japanese Unexamined Patent Application Publication (JP-A) No. 2003-238915
PTL 2: JP-A No. 2003-342542
PTL 3: JP-A No. 2004-231723

SUMMARY OF INVENTION

Technical Problem

Pressure-sensitive adhesive sheets for use in the above applications have been more and more demanded to have removability (reworkability), particularly removability (reworkability) at a low temperature, when rebonding (relamination) of optical members is required after the lamination of the optical members with each other. However, when two optical members (particularly, highly rigid optical members or thin optical members) are bonded through the customary pressure-sensitive adhesive sheets and then detached, the optical members may be disadvantageously damaged or broken due to a force applied thereon, and this may impede reworking.

Such a property as to allow a pressure-sensitive adhesive sheet to be removed (removability or reworkability) is required not only in uses where optical members are to be removed from the pressure-sensitive adhesive sheet, but also in various other uses.

Accordingly, an object of the present invention is to provide a method of detaching two plates bonded through a pressure-sensitive adhesive sheet without substantially applying such a force (load) to the plates as to cause large distortion (deformation) leading to fracture or breakage of the plates.

Solution to Problem

After intensive investigations, the present inventors have found that, when two plates have been bonded through a double-coated pressure-sensitive adhesive sheet, the two plates can be detached from each other by applying a force in a specific direction at such a temperature that the double-coated pressure-sensitive adhesive sheet has a storage elastic modulus of $1.0 \times 10^7$ Pa or more as measured by dynamic viscoelastic measurement; and that this allows detachment of the two plates without substantially applying such a force (load) to the plates as to cause large distortion (deformation) leading to fracture or breakage of the plates. The present invention has been made based on these findings.

Specifically, the present invention provides a method of detaching two plates bonded through a double-coated pressure-sensitive adhesive sheet. The method includes the step of applying a force to at least one of the two plates at least in a direction normal to the plate at such a temperature that the double-coated pressure-sensitive adhesive sheet has a storage elastic modulus of $1.0 \times 10^7$ Pa or more as measured by dynamic viscoelastic measurement.

The double-coated pressure-sensitive adhesive sheet preferably has a storage elastic modulus of $1.0 \times 10^6$ Pa or less at 23° C. as measured by dynamic viscoelastic measurement.

The step of applying the force preferably includes preparing a tool having at least a wedge-shaped head; and inserting a tapered thin edge of the wedge-shaped head of the tool between the two plates from a lateral side of the double-coated pressure-sensitive adhesive sheet.

The double-coated pressure-sensitive adhesive sheet preferably has a pressure-sensitive adhesive layer formed from a pressure-sensitive adhesive composition including an acrylic polymer obtained through polymerization of a monomer component, or a partial polymer of the monomer component, in which the monomer component includes a (meth)acrylic alkyl ester whose alkyl moiety being a linear or branched-chain alkyl group having 10 to 13 carbon atoms.

Advantageous Effects of Invention

A method of detaching plates according to an embodiment of the present invention enables detachment of two plates bonded through a double-coated pressure-sensitive adhesive sheet without substantially applying such a force (load) to the plates as to cause large distortion (deformation) leading to fracture or breakage of the plates.

These and other objects, features, and advantages of the present invention will be more fully understood from the following description of embodiments with reference to the attached drawings. All numbers are herein assumed to be modified by the term "about."

DESCRIPTION OF EMBODIMENTS

Figure 1:
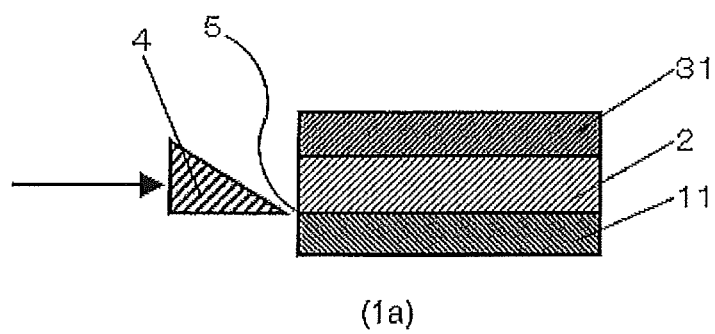
FIGS. 1a, 1b, and 1c depict an embodiment of a force application process A.
Figure 1:
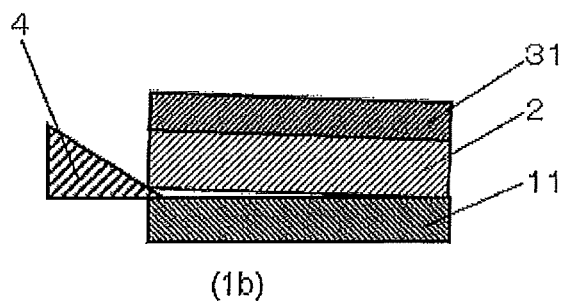
Figure 1:
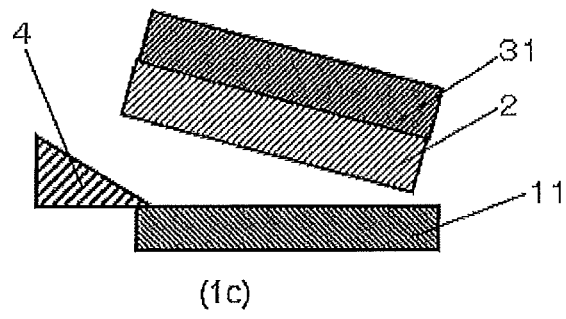

Method of Detaching Plates
A method of detaching plates according to an embodiment of the present invention is a method of detaching (delaminating) two plates from each other, the two plats having been bonded through a double-coated pressure-sensitive adhesive sheet.

As used herein the term "method of detaching plates according to (an embodiment of) the present invention" is also referred to as a "detaching method of the present invention" or simply to a "detaching method." As used herein the term "pressure-sensitive adhesive sheet" also includes and refers to a "pressure-sensitive adhesive tape." Specifically, the pressure-sensitive adhesive sheet for use herein may be a pressure-sensitive adhesive tape in the form of a tape.

The detaching method of the present invention detaches two plates, which have been bonded through a double-coated pressure-sensitive adhesive sheet, from each other by applying a force to at least one of the two plates at least in a direction normal to the plate. The term "direction normal to the plate" refers to a linear direction perpendicular to a surface of the plate (e.g., a surface of the plate to which the double-coated pressure-sensitive adhesive sheet is applied).

The phrase "applying a force at least in a direction normal to the plate" refers to the application of a force including at least a component in a direction normal to the plate. In other words, the phrase refers to that when the force to be applied is resolved, the force includes a component in a direction normal to the plate. Specifically, the phrase includes the application of a force only in a direction normal to the plate and the application of a force in a direction oblique to the surface of the plate, but excludes the application of a force only in a parallel direction to the surface of the plate (e.g., translation of the two plates without applying a force in a normal direction; and distortion (twisting) of the two plates without applying a force in a normal direction).

Detaching Temperature

A temperature upon detaching of plates in the detaching method of the present invention (hereinafter also referred to as a "detaching temperature") is such a temperature that the double-coated pressure-sensitive adhesive sheet has a storage elastic modulus of $1.0 \times 10^7$ Pa or more (preferably $1.0 \times 10^8$ Pa or more), as measured by dynamic viscoelastic measurement. At such a temperature as to have a storage elastic modulus of $1.0 \times 10^7$ Pa or more, the double-coated pressure-sensitive adhesive sheet (particularly, pressure-sensitive adhesive layer) has a high cohesive force, thereby has a lower force to adhere to the plates (to have a lower adhesive strength), and becomes resistant to deformation and tearing. This enables easy detachment of the two plates from each other in a short time without applying such a force (load) as to cause large distortion (deformation) leading to fracture or breakage of the plates.

A temperature at which the double-coated pressure-sensitive adhesive sheet has a storage elastic modulus of $1.0 \times 10^7$ Pa or more as measured by dynamic viscoelastic measurement is preferably $-60°$ C. to $0°$ C., and more preferably $-50°$ C. to $-10°$ C. The double-coated pressure-sensitive adhesive sheet is preferably one having a storage elastic modulus of $1.0 \times 10^7$ Pa or more at a temperature of $-60°$ C. to $0°$ C. as measured by dynamic viscoelastic measurement.

The detaching method performs detachment at such a temperature that the double-coated pressure-sensitive adhesive sheet has a storage elastic modulus of $1.0 \times 10^7$ Pa or more as measured by dynamic viscoelastic measurement. At this temperature, the double-coated pressure-sensitive adhesive sheet (particularly, pressure-sensitive adhesive layer) has a high cohesive force, has a weak force for adhering to plates (low adhesive force), and is resistant to deformation and tearing. This enables separation of the double-coated pressure-sensitive adhesive sheet and a plate at the interface therebetween.

The detaching method may prevent the double-coated pressure-sensitive adhesive sheet from remaining on both the two plates after detachment, or may allow the double-coated pressure-sensitive adhesive sheet to deposit and remain only one of the two plates and deposit little on the other plate. Specifically, the two plates are detached into a plate with the double-coated pressure-sensitive adhesive sheet being deposited, and a plate with a small amount of deposited double-coated pressure-sensitive adhesive sheet. The detached plate with a small amount of deposited double-coated pressure-sensitive adhesive sheet (with less adhesive deposit) is easily reusable.

The detaching method performs detachment of plates at such a temperature that the double-coated pressure-sensitive adhesive sheet has a high cohesive force and a low adhesive strength with respect to the plates. This enables detachment of two plates only by detaching a part of a bonding plane between the double-coated pressure-sensitive adhesive sheet and one plate, because the detached part triggers the detachment. Thus, the two plates can be detached from each other in a short time with a small force.

The detaching method enables detachment of plates with a weak force without applying such a force (load) as to cause large distortion (deformation) leading to fracture or breakage of the plates and can be applied to detachment of highly rigid plates (e.g., glass plates) and thin plates.

The storage elastic modulus is measured by dynamic viscoelastic measurement. The storage elastic modulus may be measured typically by the following method.

Method for Storage Elastic Modulus Measurement

The storage elastic modulus may be measured by laminating multiple plies of the double-coated pressure-sensitive adhesive sheet to a thickness of about 2 mm to give a specimen, and measuring a storage elastic modulus of the specimen with the "Advanced Rheometric Expansion System (ARES)" (Rheometric Scientific F. E. Ltd. (now TA Instruments)) at a frequency of 1 Hz, at temperatures rising from $-60°$ C., to $100°$ C. at a rate of temperature rise of $5°$ C./min.

A way to allow the double-coated pressure-sensitive adhesive sheet to have a storage elastic modulus of $1.0 \times 10^7$ Pa or more as measured by dynamic viscoelastic measurement is not limited, but may be typified by cooling or curing of the double-coated pressure-sensitive adhesive sheet.

Process for Applying Force At Least in Normal Direction of Plate

A process for applying a force at least in a direction normal to plate in the detaching method of the present invention is not limited, but may be typified by a process of preparing a tool having at least a wedge-shaped head and inserting a tapered thin edge of the wedge-shaped head of the tool between two plates, which have been bonded through a double-coated pressure-sensitive adhesive sheet, from a lateral side of the double-coated pressure-sensitive adhesive sheet; a process of pulling at least one of two plates typically with a wire or a kite string, the two plates having been bonded through a double-coated pressure-sensitive adhesive sheet; a process of fixing, to a holding plate, at least one of two plates bonded through a double-coated pressure-sensitive adhesive sheet, and pulling the holding plate; a process of applying a suction cup to at least one of two plates bonded through a double-coated pressure-sensitive adhesive sheet, and pulling the suction cup; a process of pouring water or another liquid capable swelling upon freezing into a space between one of two plates bonded through a double-coated pressure-sensitive adhesive sheet and the double-coated pressure-sensitive adhesive sheet, or into the double-coated pressure-sensitive adhesive sheet, and freezing the poured liquid; a process of applying impact to two plates bonded through a double-coated pressure-sensitive adhesive sheet typically by hitting or dropping the plates; and a process including two or more processes selected from among these processes.

Among them, preferred for easy application of a force in a short time are: the process of preparing a tool having at least a wedge-shaped head and inserting a tapered thin edge of the wedge-shaped head of the tool between two plates, which have been bonded through a double-coated pressure-sensitive adhesive sheet, from a lateral side of the double-coated pressure-sensitive adhesive sheet (hereinafter also referred to as "force application process A"); the process of pulling at least one of two plates with a wire or a kite string, the two plates having been bonded through a double-coated pressure-sensitive adhesive sheet (hereinafter also referred to as "force application process B"); and the process of fixing, to a holding plate, at least one of two plates bonded through a double-coated pressure-sensitive adhesive sheet, and pulling the holding plate (hereinafter also simply referred to as "force application process C"). Among them, the force application process A is more preferred.

Force Application Process A

A shape of the wedge-shaped head of the tool for use in the force application process A is not limited, as long as the tool having a portion being thick at one end and tapering to a thin edge (tapered thin edge) at the other. Typically, the tool may have a cross section of the wedge-shaped head (cross section from one end to the other) of approximately isosceles triangle or approximately right-angled triangle.

The tool having at least a wedge-shaped head is not limited, but may be typified by tools each made of a metal, plastic, wood, or ceramic material. Exemplary tools include edged tools (cutting tools) such as chisels, cutters, and carving knives; spatulas or lancets; needles; and stakes. Among them, metal tools (of which metal cutting tools are more preferred) and plastic tools are preferred for easy application of a force at least in a direction normal to plate.

The tapered thin edge of the wedged-shaped head of the tool may be inserted at any position in the force application process A, as long as the edge is in contact with a lateral side of the double-coated pressure-sensitive adhesive sheet, and may be inserted at a boundary between the double-coated pressure-sensitive adhesive sheet and one plate.

The tapered thin edge of the wedged-shaped head of the tool may be inserted at any angle in the force application process A, but is preferably inserted at such an angle that at least one face (bevel) constituting the wedge-shaped portion is approximately orthogonal to an adhesive face between the double-coated pressure-sensitive adhesive sheet and one plate.

The tapered thin edge of the wedged-shaped head of the tool may be inserted in any direction in the force application process A, but is preferably inserted in a direction approximately in parallel with one plate. The tapered thin edge of the wedge-shaped head of the tool, when inserted into the double-coated pressure-sensitive adhesive sheet, is preferably inserted in a direction in parallel with one plate to apply a force to the plate at least in a direction normal to the plate, because the wedged-shaped head of the tool is thick at one end and tapering to a thin edge at the other, and the tapered thin edge of the wedge-shaped head is inserted (see FIGS. 1a, 1b, and 1c).

The force application process A may employ fixing of at least one of two plates bonded through a double-coated pressure-sensitive adhesive sheet, for easy detaching operation. The plate may be fixed according to any procedure such as fixing with a fixing jig that is easily detachable.

The force application process A, when employed to apply a force in the detaching method of the present invention, enables further easier application of a force to a plate at least in a direction normal to the plate and enables further easier detachment of plates from each other.

A preferred embodiment of the force application process A will be illustrated below.

FIGS. 1a, 1b, and 1c depict an embodiment of the force application process A. In FIGS. 1a, 1b, and 1c, the reference signs 11 stands for a glass plate (a) (one plate), 2 stands for a double-coated pressure-sensitive adhesive sheet, 31 stands for a glass plate (b) (the other plate), 4 stands for a head of chisel (as a tool having at least a wedge-shaped head), 5 stands for a boundary between the double-coated pressure-sensitive adhesive sheet and the glass plate (a). A right-pointing arrow in FIG. 1a stands for a direction in which the head of chisel 4 is inserted.

In the process according to the embodiment illustrated in FIGS. 1a, 1b, and 1c, the head of chisel 4 is inserted into the boundary 5 between the double-coated pressure-sensitive adhesive sheet and the glass plate (a) in a direction in parallel with the plate (glass plate (a)) to apply a force at least in a direction normal to the glass plate (b) 31 (FIGS. 1a and 1b), and the glass plate (a) 11 and the glass plate (b) 31 are detached from each other at the boundary 5 between the glass plate (a) 11 and the double-coated pressure-sensitive adhesive sheet 2 (FIG. 1c).

Force Application Process B

In the force application process B, a wire or kite string may be pulled in any direction in as long as a force can be applied at least in a direction normal to one of two plates bonded through a double-coated pressure-sensitive adhesive sheet, but may be applied in a direction normal to the plate or a direction oblique to the surface of the plate.

For an easy detaching operation, the force application process B may employ fixing of at least one of two plates bonded through a double-coated pressure-sensitive adhesive sheet and pulling the other plate typically with a wire or kite string. The way to fix the plate is not limited, but is typified by fixing of the plate with a metal fixing jig that is easily detachable.

A preferred embodiment of the force application process B will be illustrated below.

Figure 2:
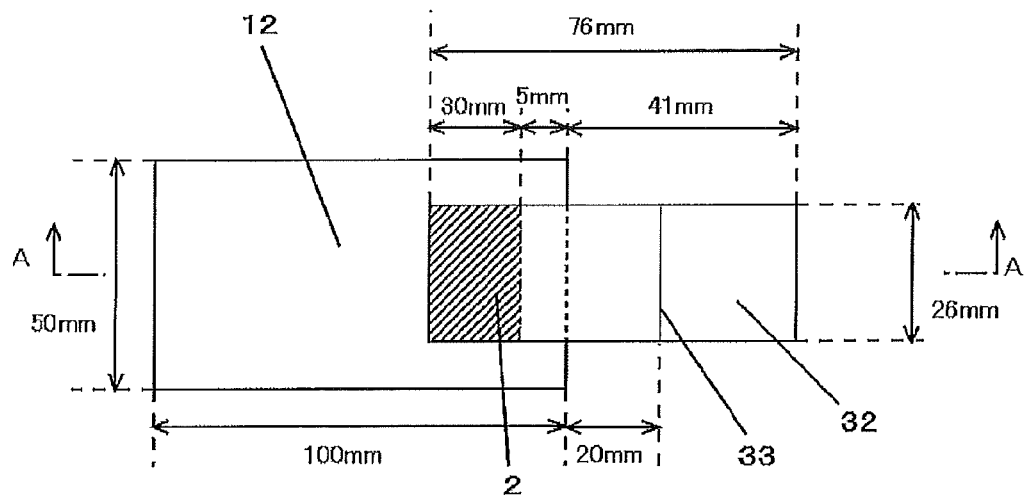
FIG. 2 depicts an embodiment of a force application process B.
Figure 3:
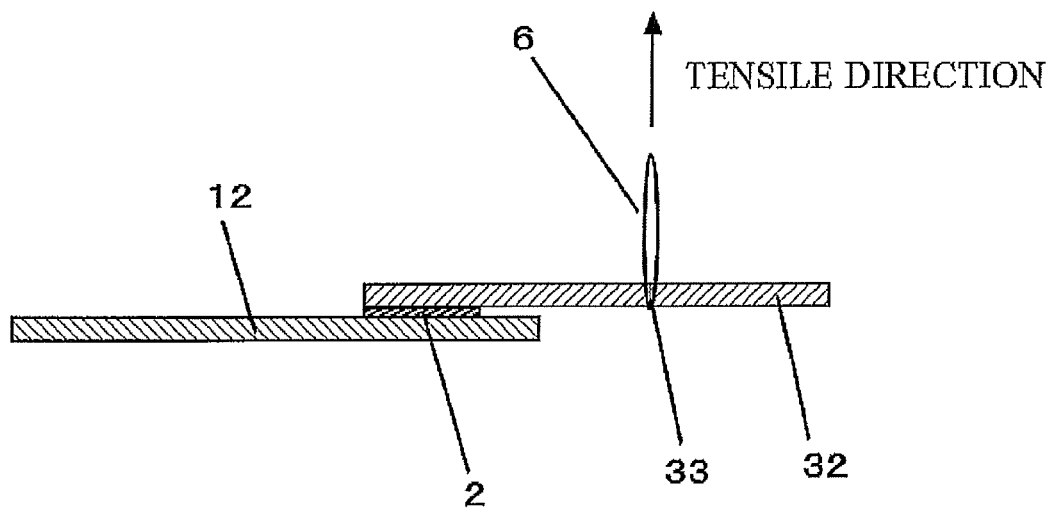
FIG. 3 depicts the embodiment of the force application process B.

FIGS. 2 and 3 illustrate an embodiment of the force application process B, in which FIG. 2 is an explanatory drawing (plan view) illustrating two plates bonded through a double-coated pressure-sensitive adhesive sheet; and FIG. 3 is an explanatory drawing (cross-sectional view taken along the line A-A in FIG. 2) illustrating the two plates bonded through the double-coated pressure-sensitive adhesive sheet, on one of which a kite string is hooked. In FIGS. 2 and 3, the reference signs 12 stands for a glass plate (c) (one plate), 2 stands for a double-coated pressure-sensitive adhesive sheet, 32 stands for a glass slide (d) (the other plate), 33 stands for a kite-string-pulling part, and 6 stands for a kite string. An up-pointing arrow in FIG. 3 stands for a direction in which the kite string 6 is pulled (tensile direction).

In the process according to the embodiment illustrated in FIGS. 2 and 3, the kite string 6 is hooked on the kite-string-pulling part 33 of the glass slide (d) 32 and then pulled to apply a force in a direction normal to the glass plate (c) 12 to thereby detach the glass plate (c) 12 and the glass slide (d) 32 from each other.

Force Application Process C

The holding plate for use in the force application process C is not limited, but may be typified by acrylic plates or other plates made from synthetic resins such as acrylic resins; and metal plates. Among them, acrylic plates are preferred, because such an acrylic holding plate is not so heavy and is easy to pull.

It is enough in the force application process C that at least one of two plates bonded through a double-coated pressure-sensitive adhesive sheet is fixed to a holding plate. Typically, only one plate may be fixed to a holding plate, or both two plates may be fixed to holding plates. Above all, both two plates are preferably fixed to holding plates for easy detachment of the plates. When two plates are both fixed to holding plates, the two holding plates may be of the same kind or not.

The holding plate(s) for use in the force application process C is preferably larger than a plate (target plate) to be fixed. Specifically, the holding plate(s) preferably has a part extending from the target plate. This is preferred because such holding plate is easy to grasp upon detachment of the plates. When the two plates are both fixed to two holding plates respectively, both the two holding plates may be larger than the fixed two target plates, respectively.

Though not critical, the holding plate(s) may have a thickness of preferably 0.5 to 10 mm, and more preferably 1 to 5 mm, because a holding plate having a thickness within this range is not so heavy and easy to pull.

A way to fix the target plate to the holding plate in the force application process C is not limited, but may be typified by bonding of the holding plate to the target plate through a pressure-sensitive adhesive sheet to thereby fix them to each other.

The fixing pressure-sensitive adhesive sheet is not limited, but may be typified by pressure-sensitive adhesive sheets (particularly, double-coated pressure-sensitive adhesive sheets) each having a fixing pressure-sensitive adhesive layer formed from any of known pressure-sensitive adhesives such as acrylic pressure-sensitive adhesives, rubber pressure-sensitive adhesives, polyolefin pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorine-containing pressure-sensitive adhesives, and epoxy pressure-sensitive adhesives. Each of different pressure-sensitive adhesives may be used alone or in combination to form a fixing pressure-sensitive adhesive layer of the fixing pressure-sensitive adhesive sheet.

The holding plate in the force application process C may be pulled in any direction, as long as a force is applied at least in a direction normal to one of two plates bonded through a double-coated pressure-sensitive adhesive sheet, but may be applied, for example, in a direction normal to the plate or in a direction oblique to the surface of the plate.

A preferred embodiment of the force application process C will be illustrated below.

Figure 4:
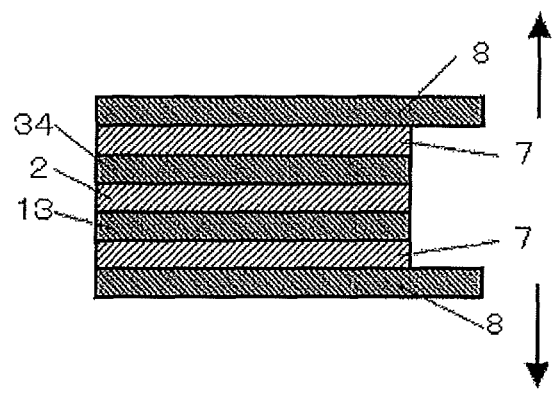
FIG. 4 depicts an embodiment of a force application process C.

FIG. 4 illustrates an embodiment of the force application process C. In FIG. 4, the reference signs 13 stands for a glass plate (e) (one plate), 2 stands for a double-coated pressure-sensitive adhesive sheet, 34 stands for a glass plate (f) (the other plate), 7 stands for a fixing pressure-sensitive adhesive sheet, and 8 stands for an acrylic plate (holding plate). In the process according to the embodiment illustrated in FIG. 4, the acrylic plates 8 are larger than the glass plate (e) 13, the double-coated pressure-sensitive adhesive sheet 2, and the glass plate (f) 34, thereby each have a protruded part, and are easy to pull by grasping the protruded part.

The force to be applied at least in a direction normal to plate in the detaching method of the present invention may have any magnitude, but may have a magnitude of preferably 0.5 to 18 N, and more preferably 1 to 15 N. The force preferably includes at least a component in a direction normal to the plate, the component having a magnitude within the above-specified range.

The detaching method may employ the application of a force to one of two plates bonded through a double-coated pressure-sensitive adhesive sheet to detach the two plates from each other (typically by the force application process A or the force application process B). After the detachment of the two plates in this manner, it is acceptable that the double-coated pressure-sensitive adhesive sheet deposits and remains on the one plate, to which the force has been applied, and no or little double-coated pressure-sensitive adhesive sheet deposits and remains on the other plate to which the force has not been applied (namely, no or little adhesive deposit is present on the other plate) (see FIG. 1c); or that the double-coated pressure-sensitive adhesive sheet deposits and remains on the other plate to which no force has been applied, and no or little double-coated pressure-sensitive adhesive sheet deposits and remains on the one plate to which the force has been applied (namely, no or little double-coated pressure-sensitive adhesive sheet is present on the one plate).

Plates

The plates are not limited, but may be typified by plates made of materials such as glass; plastics such as acrylic resins, polycarbonates, and poly(ethylene terephthalate)s; metals such as stainless steels and aluminum; and combinations of these materials. The plates are preferably plastic plates and glass plates each having high rigidity, and are more preferably glass plates, because the detaching method of the present invention enables detachment without causing fracture or breakage of the plates, even when the plates are such highly rigid plates which are not removed (detached) by peeling.

The plates are preferably optical members because of their high requirements in reworkability. The optical members are preferably members having any of optical properties such as polarizability, photorefractivity, light scattering, light reflectivity, optical transparency, optical absorptivity, optical diffractive ability, optical rotatory power, and visibility. The members having an optical property include members (plates) constituting optical products such as display devices (image display devices) and input devices and are typified by polarizing plates, wave plates, retardation films, compensation films, brightness enhancing films, light guide panels, reflective films, antireflection films, transparent conductive films (e.g., indium-tin-oxide (ITO) films), films with graphical design function, decorative films, surface-protective sheets, prisms, lenses, color filters, transparent substrates, and members (plates) as assemblies of them. As used herein the term "optical member" also includes members playing the function of decoration or protection of an adherend display device or input device with maintaining the visibility of the adherend, which are typified by films with graphical design function, decorative films, and surface-protective sheets, as described above.

The display devices (image display devices) are typified by liquid crystal display devices, organic electroluminescence (EL) display devices, plasma display panels (PDPs), and electronic papers. The input devices are exemplified by touch-screen panels.

Among them, the plates are preferably plates serving as highly rigid optical members, and particularly preferably glass optical members. Specifically, the plates are preferably plates having an optical property and made of glass, such as glass sensors, glass display panels (e.g., LCDs), and glass plates with transparent electrodes for use in touch-screen panels; and are more preferably glass sensors or glass display panels.

The two plates to be bonded through a double-coated pressure-sensitive adhesive sheet may be of the same kind or not.

The plates may have any areas but have areas of preferably more than 0 and less than or equal to 20000 cm$^2$, more preferably 1 to 15000 cm$^2$, furthermore preferably 5 to 10000 cm$^2$, still more preferably 10 to 800 cm$^2$, and particularly preferably 20 to 500 cm$^2$. The two plates to be bonded may have identical areas or not.

The plates may have any thicknesses but have thicknesses of preferably 0.1 to 5 mm, more preferably 0.3 to 3 mm, and furthermore preferably 0.5 to 2 mm. It is enough that at least one of the two plates has a thickness within the above-specified range. The two plates to be bonded may have identical thicknesses or not. The detaching method enables detachment without disadvantages such as fracture and breakage even when the method is applied to plastic plates or glass plates having high rigidity and a small thickness (e.g., thickness of 1 mm or less). This is because the method enables detachment of even thin plates incapable of being detached by peeling, without substantially applying such a force (load) to the plates as to cause large distortion (deformation) leading to fracture or breakage of the plates.

Double-Coated Pressure-Sensitive Adhesive Sheet

The double-coated (double-sided) pressure-sensitive adhesive sheet may have a storage elastic modulus as measured by dynamic viscoelastic measurement at 23° C. (hereinafter also simply referred to as a "storage elastic modulus (23° C.)") of $1.0 \times 10^6$ Pa or less (e.g., $1.0 \times 10^3$ to $1.0 \times 10^6$ Pa), preferably $5.0 \times 10^5$ Pa or less (e.g., $5.0 \times 10^3$ to $5.0 \times 10^5$ Pa), and furthermore preferably $3.0 \times 10^5$ Pa or less (e.g., $1.0 \times 10^4$ to $3.0 \times 10^5$ Pa). The double-coated pressure-sensitive adhesive sheet, when having a storage elastic modulus (23° C.) within the above-specified range, may exhibit tackiness at 23° C. (room temperature) and enables bonding of two plates. In this case, the two plates bonded through the double-coated pressure-sensitive adhesive sheet can be easily detached from each other by performing detachment at such a temperature that the double-coated pressure-sensitive adhesive sheet has a storage elastic modulus of $1.0 \times 10^7$ Pa or more.

The storage elastic modulus (23° C.) may be measured by the method for storage elastic modulus measurement.

The double-coated pressure-sensitive adhesive sheet preferably includes at least one pressure-sensitive adhesive layer formed from a pressure-sensitive adhesive composition. The double-coated pressure-sensitive adhesive sheet may further include any of a substrate and other layers (e.g., intermediate layer and/or under coat), in addition to the pressure-sensitive adhesive layer. The pressure-sensitive adhesive layer, the substrate, and the other layer may be provided each in a number of one, or two or more.

The double-coated pressure-sensitive adhesive sheet may be a double-coated pressure-sensitive adhesive sheet having no substrate (no substrate layer), i.e., a so-called "substrate-less" double-coated pressure-sensitive adhesive sheet (hereinafter also referred to as a "substrate-less double-coated pressure-sensitive adhesive sheet") or a double-coated pressure-sensitive adhesive sheet having a substrate. The substrate-less double-coated pressure-sensitive adhesive sheet is typified by a double-coated pressure-sensitive adhesive sheet including a pressure-sensitive adhesive layer alone. The double-coated pressure-sensitive adhesive sheet having a substrate is typified by a double-coated pressure-sensitive adhesive sheet including a substrate and, on both sides thereof, pressure-sensitive adhesive layers.

Among them, a substrate-less pressure-sensitive adhesive sheet is preferred for better transparency and other optical properties.

As used herein the term "substrate (substrate layer)" refers to a portion which is applied together with a pressure-sensitive adhesive layer to an adherend (e.g., optical member) when the double-coated pressure-sensitive adhesive sheet is used for (applied to) the adherend and does not include a separator (release liner) which is removed upon use (application) of the double-coated pressure-sensitive adhesive sheet.

Substrate

The substrate is not limited, but may be typified by plastic films, antireflection (AR) films, polarizing plates, retardation films, and other optical films. Exemplary materials for the plastic films and other films include plastic materials which are typified by poly(ethylene terephthalate)s (PETs) and other polyester resins, poly(methyl methacrylate)s (PMMAs) and other acrylic resins, polycarbonates, triacetylcelluloses (TACs), polysulfones, polyarylates, polyimides, poly(vinyl chloride)s, poly(vinyl acetates, polyethylenes, polypropylenes, ethylene-propylene copolymers, trade name "ARTON (cyclic olefinic polymer; JSR)," trade name "ZEONOR (cyclic olefinic polymer; ZEON CORPORATION)," and other cyclic olefinic polymers. Each of different plastic materials may be used alone or in combination.

Of such substrates, a transparent substrate is preferred. As used herein the term "transparent substrate" refers to a substrate having a high total luminous transmittance at wavelengths in the visible light region of preferably 85% or more, and more preferably 88% or more, as determined in conformance with Japanese Industrial Standard (JIS) K 7361-1. The substrate may have a haze of preferably 1.5% or less, and more preferably 1.0% or less as determined in conformance with JIS K 7136. The transparent substrate may be typified by PET films; and non-oriented films such as films made from trade name "ARTON" and trade name "ZEONOR."

Though not critical, the substrate may have a thickness of preferably 12 to 75 μm. The substrate may have a single-layer structure or multilayer structure. The substrate may have undergone, on its surface, a known or customary surface treatment which is typified by physical treatments such as corona discharge treatment and plasma treatment; and chemical treatments such as primer coating.

Pressure-Sensitive Adhesive Layer

The pressure-sensitive adhesive layer is not limited, but may be a pressure-sensitive adhesive layer formed from a pressure-sensitive adhesive composition containing any of known pressure-sensitive adhesives such as acrylic pressure-sensitive adhesives, urethane pressure-sensitive adhesives, rubber pressure-sensitive adhesives, silicone pressure-sensitive adhesives, polyester pressure-sensitive adhesives, polyamide pressure-sensitive adhesives, epoxy pressure-sensitive adhesives, vinyl alkyl ether pressure-sensitive adhesives, fluorine-containing pressure-sensitive adhesives, and polyolefin pressure-sensitive adhesives. Each of different pressure-sensitive adhesives may be used alone or in combination.

The pressure-sensitive adhesive composition may be a pressure-sensitive adhesive composition of any form, such as an emulsion, solvent-borne (solution), active-energy-ray-curable, or thermofusible (hot melt) pressure-sensitive adhesive composition.

For easy polymer designing, the pressure-sensitive adhesive layer is preferably a pressure-sensitive adhesive layer formed from a pressure-sensitive adhesive composition including an acrylic pressure-sensitive adhesive and is more preferably a pressure-sensitive adhesive layer formed from a pressure-sensitive adhesive composition including an acrylic polymer obtained through polymerization of a monomer component, or a partial polymer of the monomer component. The pressure-sensitive adhesive composition may further include any of polymerization initiators, crosslinking agents, solvents, and other additives, in addition to the acrylic polymer obtained through polymerization of a monomer component, or a partial polymer of the monomer component.

As used herein the term "(meth)acrylic" refers to "acrylic" and/or "methacrylic" (either "acrylic" or "methacrylic," or both), and the same is true for other descriptions.

Also as used herein the term "alkyl group" refers to a linear or branched chain alkyl group, unless otherwise specified.

The monomer component may be a monomer of a single type or a mixture of monomers of two or more different types.

A pressure-sensitive adhesive composition including a partial polymer of the monomer component is typified by a so-called active-energy-ray-curable pressure-sensitive adhesive composition. A pressure-sensitive adhesive composition essentially including an acrylic polymer obtained through polymerization of the monomer component is typified by a so-called solvent-borne pressure-sensitive adhesive composition.

The term "partial polymer of (the) monomer component" refers to a substance obtained through partial polymerization of one or more components constituting the monomer component. Specifically, the "partial polymer of (the) monomer component" may be typified by a mixture of a monomer component with a partial polymer of the monomer component.

Acrylic Polymer

The acrylic polymer is not limited, but may be typified by acrylic polymers each obtained through polymerization of a monomer component including a (meth)acrylic alkyl ester whose alkyl moiety having 8 to 24 carbon atoms (hereinafter also referred to as "(meth)acrylic $C_8$-$C_{24}$ alkyl ester").

More specifically, of such (meth)acrylic $C_8$-$C_{24}$ alkyl esters, (meth)acrylic alkyl esters whose alkyl moiety having 10 to 18 carbon atoms are preferred; (meth)acrylic alkyl esters whose alkyl moiety having 10 to 16 carbon atoms are more preferred; and (meth)acrylic alkyl esters whose alkyl moiety having 10 to 13 are particularly preferred.

The (meth)acrylic $C_8$-$C_{24}$ alkyl ester is not limited, but may be typified by octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, isopentadecyl (meth)acrylate, hexadecyl (meth)acrylate, isohexadecyl (meth)acrylate, heptadecyl (meth)acrylate, isoheptadecyl (meth)acrylate, octadecyl (meth)acrylate, isooctadecyl (meth)acrylate, docosyl (meth)acrylate, isodocosyl (meth)acrylate, tetracosyl (meth)acrylate, and isotetracosyl (meth)acrylate. Among them, preferred are decyl (meth)acrylate, isodecyl (meth)acrylate, undecyl (meth)acrylate, dodecyl (meth)acrylate, and tridecyl (meth)acrylate; of which dodecyl acrylate (lauryl acrylate) is more preferred.

Each of different (meth)acrylic $C_8$-$C_{24}$ alkyl esters may be used alone or in combination.

The monomer component preferably further includes a (meth)acrylic alkyl ester whose alkyl moiety having 1 to 9 carbon atoms (hereinafter also referred to as a "(meth)acrylic $C_1$-$C_9$ alkyl ester") and/or a (meth)acrylic ester having an alicyclic hydrocarbon group (hereinafter also referred to as an "alicyclic monomer").

The (meth)acrylic $C_1$-$C_9$ alkyl ester is not limited, but may be typified by methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, and isononyl (meth)acrylate. Among them, preferred are (meth)acrylic alkyl esters whose alkyl moiety having 1 to 6 carbon atoms; of which methyl (meth)acrylate and n-butyl (meth)acrylate are more preferred, and methyl acrylate and n-butyl acrylate are furthermore preferred.

Each of different (meth)acrylic $C_1$-$C_9$ alkyl esters may be used alone or in combination.

The alicyclic monomer is a an alicyclic compound serving as a monomer, i.e., a monomer having a non-aromatic ring in the molecule. The non-aromatic ring is typified by non-aromatic alicyclic rings (e.g., cycloalkane rings such as cyclopentane ring, cyclohexane ring, cycloheptane ring, and cyclooctane ring; and cycloalkene rings such as cyclohexene ring), non-aromatic bridged rings (e.g., bridged hydrocarbon rings including bicyclic hydrocarbon rings typically in pinane, pinene, bornane, norbornane, and norbornene; tricyclic hydrocarbon rings typically in adamantane; and tetracyclic hydrocarbon rings).

The alicyclic monomer is not limited, but may be typified by (meth)acrylic cycloalkyl esters such as cyclopentyl (meth)acrylate, cyclohexyl (meth)acrylate, cycloheptyl (meth)acrylate, and cyclooctyl (meth)acrylate; (meth)acrylic esters having a bicyclic hydrocarbon ring, such as bornyl (meth)acrylate, isobornyl (meth)acrylate, dicyclopentanyl (meth)acrylate and dicyclopentanyloxyethyl (meth)acrylate; and (meth)acrylic esters having a tricyclic or higher hydrocarbon ring, such as tricyclopentanyl (meth)acrylate, 1-adamantyl (meth)acrylate, 2-methyl-2-adamantyl (meth)acrylate and 2-ethyl-2-adamantyl (meth)acrylate.

Each of different alicyclic monomers may be used alone or in combination.

The alicyclic monomer is preferably any of cyclohexyl acrylate (CHA), cyclohexyl methacrylate (CHMA), isobornyl acrylate (IBXA), and isobornyl methacrylate (IBXMA).

The monomer component preferably includes substantially no carboxyl-containing monomer. The phrase "includes substantially no" refers to that the substance in question is not actively added, except for the case of inevitable contamination. Specifically, the monomer component may have a content of carboxyl-containing monomer of less than 0.05 percent by weight, preferably less than 0.01 percent by weight, and furthermore preferably less than 0.001 percent by weight, based on the total amount (100 percent by weight) of the monomer component.

The carboxyl-containing monomer may be exemplified by acrylic acid (AA), methacrylic acid, itaconic acid, maleic acid, fumaric acid, and crotonic acid. As used herein the term "carboxyl-containing monomer" also includes acid anhydrides of these carboxyl-containing monomers, such as maleic anhydride, itaconic anhydride, and other monomers containing an acid anhydride group.

The monomer component preferably further includes a polar-group-containing monomer. A polar-group-containing monomer has an appropriate polarity and, when included in the monomer component, allows the pressure-sensitive adhesive composition to give a pressure-sensitive adhesive layer which exhibits an appropriate adhesive strength.

The polar-group-containing monomer is a monomer having a polar group in the molecule. Of such polar-group-containing monomers, ethylenically unsaturated monomers are preferred. As used herein the term "polar-group-containing monomer" refers to any of polar-group-containing monomers other than carboxyl-containing monomers, i.e., any of monomers having a polar group other than carboxyl group in the molecule.

The polar-group-containing monomer is not limited, but may be typified by hydroxyl-containing monomers including hydroxyalkyl (meth)acrylates such as 2-hydroxyethyl (meth)acrylate, 3-hydroxypropyl (meth)acrylate, 4-hydroxybutyl (meth)acrylate, and 6-hydroxyhexyl (meth)acrylate, as well as vinyl alcohol and allyl alcohol; amido-containing monomers such as (meth)acrylamide, N,N-dimethyl(meth)acrylamide, N-methylol(meth)acrylamide, N-methoxymethyl (meth)acrylamide, N-butoxymethyl(meth)acrylamide, and N-hydroxyethyl(meth)acrylamide; amino-containing monomers such as aminoethyl (meth)acrylate, dimethylaminoethyl (meth)acrylate, and t-butylaminoethyl (meth)acrylate; epoxy-containing monomers such as glycidyl (meth)acrylate and methylglycidyl (meth)acrylate; cyano-containing monomers such as acrylonitrile and methacrylonitrile; heterocycle-containing vinyl monomers such as N-vinyl-2-pyrrolidone, N-vinylcaprolactam, (meth) acryloylmorpholine, N-vinylpyridine, N-vinylpiperidone, N-vinylpyrimidine, N-vinylpiperazine, N-vinylpyrrole, N-vinylimidazole, and N-vinyloxazole; sulfo-containing monomers such as sodium vinylsulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate.

Each of different polar-group-containing monomers may be used alone or in combination.

The polar-group-containing monomer is preferably, but not limited to, a hydroxyl-containing monomer and/or a nitrogen-containing monomer, and more preferably a nitrogen-containing monomer, for protecting the pressure-sensitive adhesive layer from having an excessively increased adhesive strength with time and for enabling easy detachment of plates. The nitrogen-containing monomer is a monomer having at least one nitrogen atom per molecule. Examples of the nitrogen-containing monomers include, of the amido-containing monomers and the heterocycle-containing vinyl monomers, those containing at least one nitrogen atom; of which N-vinyl-2-pyrrolidone (NVP), N-vinylcaprolactam (NVC), and N,N-dimethylacrylamide (DMAA) are preferred. The hydroxyl-containing monomer is preferably, but not limited to, 2-hydroxyethyl acrylate.

The monomer component may further include a multifunctional monomer.

The multifunctional monomer is not limited, but may be typified by hexanediol di(meth)acrylates (e.g., 1,6-hexanediol di(meth)acrylate), butanediol di(meth)acrylates, (poly)ethylene glycol di(meth)acrylate, (poly) propylene glycol di(meth)acrylate, neopentyl glycol di(meth)acrylate, pentaerythritol di(meth)acrylate, pentaerythritol tri(meth)acrylate (tetramethylolmethane tri(meth)acrylate), dipentaerythritol hexa(meth)acrylate, trimethylolpropane tri (meth)acrylate, allyl(meth)acrylate, vinyl (meth)acrylate, divinylbenzene, epoxy acrylates, polyester acrylates, and urethane acrylates. Among them, 1,6-hexanediol diacrylate (HDDA) is preferred.

Each of different multifunctional monomers may be used alone or in combination.

The monomer component may further include one or more monomers (additional monomers) other than the (meth) acrylic $C_8$-$C_{24}$ alkyl esters, (meth)acrylic $C_1$-$C_9$ alkyl esters, alicyclic monomers, polar-group-containing monomers, and multifunctional monomers.

Exemplary additional monomers include (meth)acrylic esters other than the (meth)acrylic $C_8$-$C_{24}$ alkyl esters, (meth) acrylic $C_1$-$C_9$ alkyl esters, alicyclic monomers, polar-group-containing monomers, and multifunctional monomers, which are typified by (meth)acrylic esters having an aromatic hydrocarbon group, such as phenyl (meth)acrylate, phenoxyethyl (meth)acrylate, and benzyl (meth)acrylate; and (meth)acrylic alkoxyalkyl esters such as methoxyethyl (meth)acrylate and ethoxyethyl (meth)acrylate. Exemplary additional monomers further include vinyl esters such as vinyl acetate and vinyl propionate; aromatic vinyl compounds such as styrene and vinyltoluenes; olefins or dienes such as ethylene, butadiene, isoprene, and isobutylene; vinyl ethers such as vinyl alkyl ethers; and vinyl chloride.

Each of different additional monomers may be used alone or in combination.

Though not critical, the monomer component may have a content of a (meth)acrylic $C_8$-$C_{24}$ alkyl ester or esters of preferably 45 to 100 percent by weight, more preferably 50 to 95 percent by weight, and furthermore preferably. 60 to 90 percent by weight, based on the total amount (100 percent by weight) of the monomer component. The monomer component, when having a content of (meth)acrylic $C_8$-$C_{24}$ alkyl esters of 45 percent by weight or more, may give, through polymerization, an acrylic polymer having superior reworkability at a low temperature (about −60° C. to about 20° C.)

The monomer component may have a content of a (meth) acrylic $C_1$-$C_9$ alkyl ester or esters, when included, of not critical, but preferably more than 0 percent by weight and less than or equal to 50 percent by weight, more preferably 5 to 35 percent by weight, and furthermore preferably 10 to 25 percent by weight, based on the total amount (100 percent by weight) of the monomer component. The monomer component, when having a content of (meth)acrylic $C_1$-$C_9$ alkyl ester(s) of 50 percent by weight or less, may give an acrylic polymer having a more appropriate elastic modulus and exhibiting a higher adhesive strength at room temperature (about 23° C.).

The monomer component may have a content of an alicyclic monomer or monomers, when included, of not critical, but preferably more than 0 percent by weight and less than or equal to 50 percent by weight, more preferably 5 to 35 percent by weight, furthermore preferably 8 to 30 percent by weight, and particularly preferably 10 to 25 percent by weight, based on the total amount (100 percent by weight) of the monomer component. The monomer component, when having a content of alicyclic monomer(s) of 50 percent by weight or less, may give an acrylic polymer having a more appropriate elastic modulus and exhibiting a higher adhesive strength at room temperature (about 23° C.).

Particularly when including both a (meth)acrylic $C_1$-$C_9$ alkyl ester(s) and an alicyclic monomer(s), the monomer component may have a total content of these monomers of preferably more than 0 percent by weight and less than or equal to 50 percent by weight, more preferably 5 to 35 percent by weight, furthermore preferably 8 to 30 percent by weight, and particularly preferably 10 to 25 percent by weight, based on the total amount (100 percent by weight) of the monomer component.

The monomer component may have a content of a polar-group-containing monomer or monomers, when included, of not critical, but preferably more than 0 percent by weight and less than or equal to 20 percent by weight, more preferably 2 to 10 percent by weight, and furthermore preferably 3 to 8 percent by weight, based on the total amount (100 percent by weight) of the monomer component. The monomer component, when having a content of polar-group-containing monomer(s) of 20 percent by weight or less, may give an acrylic polymer which is protected from having an excessively increased adhesive strength with time and which enables easier detachment of plates. The monomer component more preferably has a total sum (total content) of the content of hydroxyl-containing monomers and the content of nitrogen-containing monomers falling within the above-specified range.

The monomer component may have a content of a multifunctional monomer or monomers, when included, of not critical, but preferably more than 0 percent by weight and less than or equal to 1 percent by weight, more preferably 0.02 to 0.1 percent by weight, and furthermore preferably 0.03 to 0.08 percent by weigh, based on the total amount (100 percent by weight) of the monomer component. This may give, through polymerization, an acrylic polymer having a gel fraction controlled within a preferred range. The monomer component, when having a content of multifunctional monomer(s) of 1 percent by weight or less, may give, through polymerization, an acrylic polymer which may be protected from having an excessively high gel fraction and which may advantageously help a pressure-sensitive adhesive layer including the acrylic polymer to have better bump absorptivity. As used herein the term "bump absorptivity" refers to a capability of filling in bumps such as printed-ink bumps and is also referred to as "bump conformability."

The pressure-sensitive adhesive composition, when containing a crosslinking agent, does not have to employ the multifunctional monomer(s) in the monomer component; but the composition, when containing no crosslinking agent, preferably employs the multifunctional monomer(s) in the monomer component in a content within the above-specified range.

In other words, an acrylic polymer obtained through polymerization of the monomer component (hereinafter also simply referred to as "acrylic polymer") preferably includes constitutional units derived from a (meth)acrylic $C_8$-$C_{24}$ alkyl ester. The acrylic polymer preferably includes substantially no constitutional unit derived from a carboxyl-containing monomer. The acrylic polymer preferably further includes constitutional units derived from a (meth)acrylic $C_1$-$C_9$ alkyl ester and/or constitutional units derived from an alicyclic monomer. The acrylic polymer preferably further includes constitutional units derived from a polar-group-containing monomer. The acrylic polymer may include any of constitutional units derived from a multifunctional monomer and constitutional units derived from an additional monomer. Constitutional units of each category may be those of a single type or those of two or more different types.

Though not critical, the acrylic polymer may have a content of constitutional units derived from a (meth)acrylic $C_8$-$C_{24}$ alkyl ester(s) of preferably 45 to 100 percent by weight, more preferably 50 to 95 percent by weight, and furthermore preferably 60 to 90 percent by weight, based on the total amount (100 percent by weight) of the acrylic polymer. The acrylic polymer may have a content of constitutional units derived from a (meth)acrylic $C_1$-$C_9$ alkyl ester(s), when included, of preferably more than 0 percent by weight and less than or equal to 50 percent by weight, more preferably 5 to 35 percent by weight, and furthermore preferably 10 to 25 percent by weight. The acrylic polymer may have a content of constitutional units derived from an alicyclic monomer(s), when included, of preferably more than 0 percent by weight and less than or equal to 50 percent by weight, more preferably 5 to 35 percent by weight, furthermore preferably 8 to 30 percent by weight, and particularly preferably 10 to 25 percent by weight. The acrylic polymer may have a total content of constitutional units derived from a (meth)acrylic $C_1$-$C_9$ alkyl ester(s) and constitutional units derived from an alicyclic monomer(s), when both included, of preferably more than 0 percent by weight and less than or equal to 50 percent by weight, more preferably 5 to 35 percent by weight, furthermore preferably 8 to 30 percent by weight, and particularly preferably 10 to 25 percent by weight. The acrylic polymer may have a content of constitutional units derived from a polar-group-containing monomer(s), when included, of preferably more than 0 percent by weight and less than or equal to 20 percent by weight, more preferably 2 to 10 percent by weight, and furthermore preferably 3 to 8 percent by weight. The acrylic polymer may have a content of constitutional units derived from a multifunctional monomer(s), when included, of preferably more than 0 percent by weight and less than or equal to 1 percent by weight, more preferably 0.02 to 0.1 percent by weight, and furthermore preferably 0.03 to 0.08 percent by weight.

The pressure-sensitive adhesive composition, in a preferred embodiment, is a pressure-sensitive adhesive composition including an acrylic polymer obtained through polymerization of a monomer component, or a partial polymer of the monomer component, in which the monomer component essentially includes a (meth)acrylic alkyl ester whose alkyl moiety having 10 to 13 carbon atoms (hereinafter also referred to as a "(meth)acrylic $C_{10}$-$C_{13}$ alkyl ester").

The pressure-sensitive adhesive composition according to the embodiment employs a (meth)acrylic $C_{10}$-$C_{13}$ alkyl ester in the monomer component and has satisfactory tackiness at room temperature, but exhibits a low adhesive strength and becomes easily peelable (removable) at a low temperature (about −60° C. to about 20° C.), and thereby has more superior low-temperature reworkability.

The acrylic polymer obtained through polymerization of the monomer component employs a (meth)acrylic $C_{10}$-$C_{13}$ alkyl ester as an essential monomer component and thereby has side chain crystallinity, in which side chains of constitutional units derived from the (meth)acrylic $C_{10}$-$C_{13}$ alkyl ester are crystallized. Crystals formed from the side chains probably have crystal melting temperatures of about −60° C. to about 20° C. Owing to this, the acrylic polymer is non-crystalline at room temperature (about 23° C.), but undergoes crystallization of side chains of constitutional units derived from the (meth)acrylic $C_{10}$-$C_{13}$ alkyl ester at a low temperature (about −60° C. to about 20° C.). The acrylic polymer derived from the (meth)acrylic $C_{10}$-$C_{13}$ alkyl ester as an essential monomer component therefore has satisfactory tackiness at room temperature, but, at a low temperature, has a higher elastic modulus, exhibits a low adhesive strength, becomes more easily removable, and exhibits superior reworkability.

Pressure-sensitive adhesive sheets, particularly pressure-sensitive adhesive layers, when applied to an adherend made of a metal or metal oxide (e.g., a transparent conductive layer of a transparent conductive film such as an indium-tin-oxide (ITO) film), may require such a property as not to cause corrosion on the adherend (this property is also referred to as "less-corrosive property"). With expanding uses of display devices and input devices, pressure-sensitive adhesive sheets (particularly pressure-sensitive adhesive layers) for use in such devices should exhibit sufficient properties as pressure-sensitive adhesive sheets in a wide variety of environments.

Typically, they may require blistering/separation resistance so as not to suffer from blistering and separation in a high-temperature environment or a high-temperature and high-humidity environment. The bump absorptivity, less-corrosive property, and blistering/separation resistance are required not only in lamination with optical members but also in various other uses.

The pressure-sensitive adhesive composition according to the embodiment employs a (meth)acrylic $C_{10}$-$C_{13}$ alkyl ester as an essential component in the monomer component and thereby includes, through polymerization of the monomer component, an acrylic polymer appropriately soft (flexible) at room temperature. This may give a pressure-sensitive adhesive sheet which can easily conform to bumps and exhibits superior bump absorptivity even when applied to a member having bumps, such as a glass plate having printed-ink bumps.

The pressure-sensitive adhesive composition according to the embodiment preferably employs substantially no carboxyl-containing monomer in the monomer component. This may give a pressure-sensitive adhesive sheet which does not corrode an adherend and which has excellent less-corrosive property even when applied to an adherend transparent conductive layer containing a metal or metal oxide, such as an ITO film. This pressure-sensitive adhesive sheet also has superior bump absorptivity at room temperature and less suffers from an increasing adhesive strength with time. Specifically, an acrylic polymer obtained through polymerization of such monomer component including substantially no carboxyl-containing monomer may exhibit further better less-corrosive property, have more stable and better bump absorptivity at room temperature by the action of the acrylic polymer, and/or enable more stable detachment.

The pressure-sensitive adhesive composition according to the embodiment, when further including a (meth)acrylic $C_1$-$C_9$ alkyl ester in the monomer component, may give a pressure-sensitive adhesive layer which has a higher cohesive force and a higher elastic modulus at room temperature, has further better blistering/separation resistance, and can be handled more easily.

The use of a monomer component essentially including a (meth)acrylic alkyl ester whose alkyl moiety having 10 to 13 carbon atoms is described above as an illustrative embodiment. However, instead of using a (meth)acrylic alkyl ester whose alkyl moiety having 10 to 13 carbon atoms, a' pressure-sensitive adhesive composition can provide satisfactory reworkability as above, by employing a (meth)acrylic alkyl ester whose alkyl moiety having 1 to 9 carbon atoms in combination with a (meth)acrylic alkyl ester whose alkyl moiety having 14 to 24 carbon atoms in the monomer component.

Polymerization Process to Form Acrylic Polymer

Such acrylic polymer obtained through polymerization of the monomer component may be prepared by polymerizing the monomer component or a partial polymer of the monomer component (e.g., a mixture of a monomer component with a partial polymer of the monomer component) according to a known or customary polymerization process.

Exemplary polymerization processes of the monomer component or a partial polymer of the monomer component include solution polymerization, emulsion polymerization, bulk polymerization, and polymerization upon application of heat or an active energy ray (thermal polymerization or active-energy-ray-polymerization). Among them, solution polymerization and active-energy-ray-polymerization are preferred for satisfactory transparency, waterproof, and cost. Though not limited, the monomer component or a partial polymer of the monomer component is preferably prevented from being in contact with oxygen during polymerization. For example, polymerization under a nitrogen atmosphere is preferred.

Exemplary active energy rays to be applied upon the active-energy-ray-polymerization (photopolymerization) include ionizing radiation such as alpha rays, beta rays, gamma rays, neutron beams, and electron beams; and ultraviolet rays, of which ultraviolet rays are preferred. Conditions for the active energy ray irradiation, such as irradiation energy, irradiation time, and irradiation procedure, are not limited, as long as a photoinitiator is activated to induce a reaction of a monomer component.

The solution polymerization may employ a solvent of every kind. The solvent herein is typified by organic solvents including esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone. Each of different solvents may be used alone or in combination.

The polymerization of a monomer component or a partial polymer of the monomer component may employ any of polymerization initiators such as photoinitiators (photopolymerization initiators) and thermal initiators, depending on the type of the polymerization reaction. Each of different polymerization initiators may be used alone or in combination.

The photoinitiators are not limited, but may be typified by benzoin ether photoinitiators, acetophenone photoinitiators, α-ketol photoinitiators, aromatic sulfonyl chloride photoinitiators, photoactive oxime photoinitiators, benzoin photoinitiators, benzil photoinitiators, benzophenone photoinitiators, ketal photoinitiators, and thioxanthone photoinitiators. Though not critical, such photoinitiator(s) may be used in an amount of preferably 0.01 to 1 part by weight, and more preferably 0.05 to 0.5 part by weight, per 100 parts by weight of the total amount of the monomer component.

The benzoin ether photoinitiators are exemplified by benzoin methyl ether, benzoin ethyl ether, benzoin propyl ether, benzoin isopropyl ether, benzoin isobutyl ether and 2,2-dimethoxy-1,2-diphenylethan-1-one. The acetophenone photoinitiators are typified by 2,2-diethoxyacetophenone, 2,2-dimethoxy-2-phenylacetophenone, 1-hydroxycyclohexyl phenyl ketone (α-hydroxycyclohexyl phenyl ketone), 4-phenoxydichloroacetophenone, and 4-(t-butyl)dichloroacetophenone. The α-ketol photoinitiators are typified by 2-methyl-2-hydroxypropiophenone and 1-[4-(2-hydroxyethyl)phenyl]-2-methylpropan-1-one. The aromatic sulfonyl chloride photoinitiators are typified by 2-naphthalenesulfonyl chloride. The photoactive oxime photoinitiators are typified by 1-phenyl-1,1-propanedione-2-(o-ethoxycarbonyl) oxime. The benzoin photoinitiators include benzoin. The benzil photoinitiators include benzil. The benzophenone photoinitiators are exemplified by benzophenone, benzoylbenzoic acid, 3,3'-dimethyl-4-methoxybenzophenone and polyvinylbenzophenone. The ketal photoinitiators include benzyl dimethyl ketal. The thioxanthone photoinitiators are typified by thioxanthone, 2-chlorothioxanthone, 2-methylthioxanthone, 2,4-dimethylthioxanthone, isopropylthioxanthone, 2,4-diisopropylthioxanthone, and dodecylthioxanthone.

Polymerization initiators for use in polymerization through the solution polymerization are typified by azo polymerization initiators, peroxide polymerization initiators (e.g., dibenzoyl peroxide and tert-butyl permaleate), and redox polymerization initiators. Among them, azo polymerization initiators disclosed in JP-A No. 2002-69411 are preferred, which are typified by 2,2'-azobisisobutyronitrile, 2,2'-azobis-2-methylbutyronitrile, dimethyl 2,2'-azobis(2-methylpropionate), and 4,4'-azobis-4-cyanovaleric acid. Such azo polymerization initiators may be used in an amount of preferably 0.05 to 0.5 part by weight, and more preferably 0.1 to 0.3 part by weight, per 100 parts by weight of the total amount of the monomer component.

Crosslinking Agent

The pressure-sensitive adhesive composition may include a crosslinking agent. The crosslinking agent is not limited, but may be typified by isocyanate crosslinking agents, epoxy crosslinking agents, melamine crosslinking agents, peroxide crosslinking agents, urea crosslinking agents, metal alkoxide crosslinking agents, metal chelate crosslinking agents, metal salt crosslinking agents, carbodiimide crosslinking agents, oxazoline crosslinking agents, aziridine crosslinking agents, and amine crosslinking agents. Among them, isocyanate crosslinking agents and epoxy crosslinking agents are preferred.

Each of different crosslinking agents may be used alone or in combination.

The isocyanate crosslinking agents (multifunctional isocyanate compounds) include lower aliphatic polyisocyanates such as 1,2-ethylene diisocyanate, 1,4-butylene diisocyanate, and 1,6-hexamethylene diisocyanate; alicyclic polyisocyanates such as cyclopentylene diisocyanate, cyclohexylene diisocyanate, isophorone diisocyanate, hydrogenated tolylene diisocyanate, and hydrogenated xylene diisocyanate; and aromatic polyisocyanates such as 2,4-tolylene diisocyanate, 2,6-tolylene diisocyanate, 4,4'-diphenylmethane diisocyanate, and xylylene diisocyanate; as well as an adduct of tolylene diisocyanate with trimethylolpropane [trade name "CORONATE L"; Nippon Polyurethane Industry Co., Ltd.] and an adduct of hexamethylene diisocyanate with trimethylolpropane [trade name "CORONATE HL"; Nippon Polyurethane Industry Co., Ltd.].

The epoxy crosslinking agents (multifunctional epoxy compounds) are typified by N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, diglycidyl adipate, o-diglycidyl phthalate, triglycidyl tris(2-hydroxyethyl)isocyanurate, resorcinol diglycidyl ether, and bisphenol-S diglycidyl ether; as well as epoxy resins each having two or more epoxy groups per molecule. The epoxy crosslinking agents are also available as commercial products such as trade name "TETRAD C" from Mitsubishi Gas Chemical Company, Inc.

Though not critical, the pressure-sensitive adhesive composition may contain the crosslinking agent(s) in a content of preferably 0.001 to 10 parts by weight, and more preferably 0.01 to 3 parts by weight, per 100 parts by weight of the total amount of the monomer component. This may allow the pressure-sensitive adhesive composition to form a pressure-sensitive adhesive layer having a gel fraction controlled within a preferred range.

Solvent

The pressure-sensitive adhesive composition may contain a solvent. The solvent is not limited, but is typified by organic solvents including esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone.

Each of different solvents may be used alone or in combination.

Other Additives

The pressure-sensitive adhesive composition may contain any of known additives (other additives) according to necessity. Such other additives include cross-linking promoters, tackifier resins (e.g., rosin derivatives, polyterpene resins, petroleum resins, and oil-soluble phenols), age inhibitors, fillers, colorants (e.g., pigments and dyestuffs), ultraviolet absorbers, antioxidants, chain-transfer agents, plasticizers, softeners, surfactants, and antistatic agents.

The way to prepare the pressure-sensitive adhesive composition is not limited, but may be typified by a process of blending or mixing an acrylic polymer obtained through polymerization of a monomer component, or a partial polymer of the monomer component, and components added according to necessity (hereinafter also referred to as "optional components") such as the polymerization initiators, solvents, and other additives.

Typically, a pressure-sensitive adhesive composition essentially including a partial polymer of the monomer component may be prepared by mixing a partial polymer of the monomer component with optional components such as the polymerization initiators, solvents, and other additives. A pressure-sensitive adhesive composition essentially including an acrylic polymer obtained through polymerization of the monomer component may be prepared typically by dissolving the acrylic polymer and optional components, such as the other additives, in a solvent.

The partial polymer of the monomer component may have a degree of polymerization of not critical, but preferably 5 to 20 percent by weight, and more preferably 5 to 15 percent by weight. Within this range, the pressure-sensitive adhesive composition may have a viscosity suitable for handling and coating.

A degree of polymerization of a partial polymer of the monomer component may be determined in the following manner.

A part of the partial polymer of the monomer component is sampled as a specimen. The specimen is weighed precisely to give a "weight of the partial polymer before drying." Next, the specimen is dried at 130° C. for 2 hours, and the dried specimen is precisely weighed to give a "weight of the partial polymer after drying." A weight loss of the specimen on drying at 130° C. for 2 hours is determined based on the "weight of the partial polymer before drying" and the "weight of the partial polymer after drying" and defined as a "weight loss" (volatile content; weight of unreacted monomers).

A degree of polymerization (percent by weight) of the partial polymer of the monomer component is determined from the "weight of the partial polymer before drying" and the "weight loss" according to the following equation:

Degree of polymerization (percent by weight) of partial polymer of monomer component=[1−(Weight loss)/(Weight of partial polymer before drying)]×100

The pressure-sensitive adhesive composition may be used for the formation of a pressure-sensitive adhesive layer containing an acrylic polymer obtained through polymerization of the monomer component.

The pressure-sensitive adhesive layer essentially includes an acrylic polymer obtained through polymerization of a monomer component. Though not critical, the pressure-sensitive adhesive layer may include the acrylic polymer in a content of 50 percent by weight or more, more preferably 60 percent by weight or more, and furthermore preferably 80 percent by weight or more, based on the total weight (100 percent by weight) of the pressure-sensitive adhesive layer. Within this range, the pressure-sensitive adhesive layer may excel in reworkability, bump absorptivity, and less-corrosive property.

Though not critical, the pressure-sensitive adhesive layer may have a thickness of preferably 10 µm to 1 mm, more preferably 100 to 500 µm, and furthermore preferably 150 to 350 µm. The pressure-sensitive adhesive layer, when having a thickness of 10 µm or more, may have better conformability to bumps to exhibit better bump absorptivity. The pressure-sensitive adhesive layer, when having a thickness of 1 mm or less, may be resistant to deformation to exhibit better workability.

Though not critical, the pressure-sensitive adhesive layer may have a gel fraction of preferably 20 to 90 percent by weight, more preferably 30 to 85 percent by weight, and furthermore preferably 40 to 80 percent by weight. The pressure-sensitive adhesive layer, when having a gel fraction of 90 percent by weight or less, may have a somewhat small cohesive force, become more flexible, and have better conformability to bumps to exhibit better bump absorptivity. In contrast, the pressure-sensitive adhesive layer, if having a gel fraction of less than 20 percent by weight, may become excessively soft to suffer from insufficient workability. This pressure-sensitive adhesive layer may often suffer from blisters and/or gaps in a high-temperature environment or a high-temperature and high-humidity environment to have insufficient blistering/separation resistance. The gel fraction may be controlled by the types and contents (amounts) of a multifunctional monomer and/or a crosslinking agent.

The gel fraction (percentage of solvent-insoluble matter) may be determined as a percentage of ethyl-acetate-insoluble matter. Specifically, the gel fraction may be determined by immersing a sample pressure-sensitive adhesive layer in ethyl acetate at room temperature (23° C.) for 7 days, determining a weight fraction (unit: percent by weight) of the resulting insoluble matter based on the weight of the sample before immersion, and defining this as a gel fraction. More specifically, the term "gel fraction" herein refers to a value determined according to the following "method for gel fraction measurement."

Method for Gel Fraction Measurement

About one gram of a pressure-sensitive adhesive layer is sampled to give a specimen, the specimen is weighed, and the measured weight is defined as a "weight of the pressure-sensitive adhesive layer before immersion." Next, the pressure-sensitive adhesive layer specimen is immersed in 40 g of ethyl acetate for 7 days, all components (insoluble matter) insoluble in ethyl acetate are collected, the collected entire insoluble matter is dried at 130° C. for 2 hours to remove ethyl acetate, the dried insoluble matter is weighed, and the measured weight is defined as a "dry weight of insoluble matter" (weight of the pressure-sensitive adhesive layer after immersion). A gel fraction is determined by substituting the determined values in the following equation:

Gel fraction (percent by weight)=[(Dry weight of insoluble matter)/(Weight of pressure-sensitive adhesive layer before immersion)]×100

Though not critical, the pressure-sensitive adhesive layer may have a weight-average molecular weight of a solvent-soluble fraction (sol fraction) of preferably $1.0 \times 10^5$ to $5.0 \times 10^6$, more preferably $2.0 \times 10^5$ to $2.0 \times 10^6$, and furthermore preferably $3.0 \times 10^5$ to $1.0 \times 10^6$. The pressure-sensitive adhesive layer, if having a weight-average molecular weight of the sol fraction of less than $1.0 \times 10^5$, may have an insufficient adhesive strength. The pressure-sensitive adhesive layer, if having a weight-average molecular weight of the sol fraction of more than $5.0 \times 10^6$, may have an excessively high elastic modulus to have an insufficient adhesive strength.

The "weight-average molecular weight of the solvent-soluble fraction (sol fraction)" may be determined according to the following measurement method.

Method for Measurement of Weight-average Molecular Weight of Solvent-Soluble Fraction (Sol Fraction)

About one gram of a pressure-sensitive adhesive layer is sampled to give a specimen, and the specimen is covered with a porous tetrafluoroethylene sheet having an average pore size of 0.2 µm (trade name "NTF1122," Nitto Denko Corporation), and tied with a kite string. The resulting entire article is hereinafter referred to as a "sample." Next, the sample is placed in 50 ml of ethyl acetate filling in a 50-ml vessel and left stand at 23° C. for one week (7 days). An ethyl acetate solution (including extracted sol fraction) is recovered from the vessel, dried under reduced pressure to volatilize the solvent (ethyl acetate), and thereby yields a sol fraction.

The sol fraction is dissolved in tetrahydrofuran (THF), and a weight-average molecular weight (Mw) of the sol fraction is measured through gel permeation chromatography (GPC) in terms of a polystyrene standard using a GPC analyzer, trade name "HLC-8120GPC" (Tosoh Corporation), under the following measurement conditions.

GPC Measurement Conditions
Sample concentration: 0.2 percent by weight (tetrahydrofuran solution)
Sample volume: 10 µl
Eluent: tetrahydrofuran (THF)
Flow rate: 0.6 mL/min
Column temperature (measurement temperature): 40° C.
Column: trade name "TSKgelSuperHM-H/H4000/H3000/H2000"(Tosoh Corporation)
Detector: differential refractive index detector (RI)

The pressure-sensitive adhesive layer may have a melting point of not critical, but preferably −60° C. to 20° C., more preferably −40° C. to 10° C., and furthermore preferably −30° C. to 0° C. The pressure-sensitive adhesive layer, if having a melting point of higher than 20° C., may fail to exhibit a sufficient adhesive strength at room temperature.

Though not limited, the melting point may be measured typically by differential scanning calorimetry (DSC) in conformance with JIS K 7121 using the pressure-sensitive adhesive layer as a testing sample. Specifically, the melting point may be measured using the device "Q-2000" (TA Instruments) as a measuring instrument at temperatures rising from −80° C. to 80° C. at a rate of temperature rise of 10° C./min. More specifically, the melting point may be measured according to the following method.

Method for Melting Point Measurement

A pressure-sensitive adhesive layer of a sample double-coated pressure-sensitive adhesive sheet is sampled (2 to 3 mg), placed in an aluminum vessel, followed by crimping of the vessel, and thereby yields a testing sample. The testing sample is subjected to a measurement with a differential scanning calorimeter (DSC) (e.g., the device name "Q-2000," TA Instruments) in conformance with JIS K 7121 at temperatures rising from −80° C. to 80° C. at a rate of temperature rise of 10° C./min, and an endothermic peak temperature (Tm) of the testing sample is determined and defined as a melting point.

Separator

Surfaces (adhesive faces) of pressure-sensitive adhesive layers of the double-coated pressure-sensitive adhesive sheet may be protected by a separator or separators (release liner(s)). The two adhesive faces of the double-coated pressure-sensitive adhesive sheet may be protected by two separators respectively, or may be protected by one separator having release surfaces as both sides, where the sheet and the separator placed thereon are together wound to form a roll. The separator serves as a protector for a pressure-sensitive adhesive layer and will be removed when the double-coated pressure-sensitive adhesive sheet is applied to adherends. The separator also serves as a support for the pressure-sensitive adhesive layer. Such separator does not always have to be provided.

The separator may employ a customary release paper, is not limited, but may be typified by base materials having a release agent layer; low-adhesive base materials including a fluorocarbon polymer; and low-adhesive base materials including a nonpolar polymer. The base materials having a release agent layer are exemplified by plastic films and papers whose surface has been treated with a releasing agent such as silicone release agents, long-chain alkyl release agents, fluorocarbon release agents, and molybdenum sulfide release agents. The fluorocarbon polymer is typified by polytetrafluoroethylenes, polychlorotrifluoroethylenes, polyvinyl fluoride)s, poly(vinylidene fluoride)s, tetrafluoroethylene-hexafluoropropylene copolymers, and chlorofluoroethylene-vinylidene fluoride copolymers. The nonpolar polymer is typified by olefinic resins such as polyethylenes and polypropylenes. The separator may be formed according to a known or customary procedure. The separator is not limited typically in thickness.

Production Process

The double-coated pressure-sensitive adhesive sheet may be produced by a known or customary production process. A way to produce the double-coated pressure-sensitive adhesive sheet may differ depending typically on the formulation of the pressure-sensitive adhesive composition, is not limited, but may be typified by the following processes (1) to (3):

(1) A process of applying a pressure-sensitive adhesive composition to a substrate or separator, and curing the applied composition to give a double-coated pressure-sensitive adhesive sheet, in which the pressure-sensitive adhesive composition includes a partial polymer of the monomer component and other optional components such as a polymerization initiator, a solvent, a crosslinking agent, and other additives, and the curing may be performed typically through the application of heat or an active energy ray such as an ultraviolet ray;

(2) A process of applying a pressure-sensitive adhesive composition (solution) to a substrate or separator, and drying and/or curing the applied composition to give a double-coated pressure-sensitive adhesive sheet, in which the pressure-sensitive adhesive composition is a solution of the acrylic polymer and optional components such as a crosslinking agent and other additives dissolved in a solvent;

(3) A process of further drying the double-coated pressure-sensitive adhesive sheet produced in Process (1).

When the production process employs curing with an active energy ray (photocuring), the photocuring is preferably performed with blocking of oxygen typically by laminating a separator to the pressure-sensitive adhesive layer or by performing photocuring under a nitrogen atmosphere, because such photopolymerization reaction may be inhibited by oxygen in the atmosphere (air).

The application (coating) in the production process of the double-coated pressure-sensitive adhesive sheet may employ a known coating procedure and may use any of customary coaters such as rotogravure roll coaters, reverse roll coaters, kiss-contact roll coaters, dip roll coaters, bar coaters, knife coaters, spray coaters, comma coaters, and direct coaters.

Though not limited, the double-coated pressure-sensitive adhesive sheet is preferably produced from a pressure-sensitive adhesive composition containing a partial polymer of the monomer component and a polymerization initiator (such as a photoinitiator or thermal initiator) through a curing reaction by the action of an active energy ray or heat. This may provide satisfactory productivity. The double-coated pressure-sensitive adhesive sheet is also preferably produced from a pressure-sensitive adhesive composition containing a photoinitiator through a curing reaction by the action of an active energy ray. This may give pressure-sensitive adhesive layers having large thicknesses.

The double-coated pressure-sensitive adhesive sheet may have a thickness (total thickness) of not critical, but preferably 10 μm to 1 mm, more preferably 100 to 500 μm, and furthermore preferably 150 to 350 μm. The double-coated pressure-sensitive adhesive sheet, when having a thickness of 10 μm or more, may allow pressure-sensitive adhesive layers to conform to bumps more satisfactorily to exhibit better bump absorptivity and may enable easier application of a force at least in a direction normal to the plate. As used herein the "thickness" of the double-coated pressure-sensitive adhesive sheet refers to a thickness (distance) from one adhesive face to the other adhesive face in the double-coated pressure-sensitive adhesive sheet. The "thickness" of the double-coated pressure-sensitive adhesive sheet does not include the thickness of a separator(s).

The double-coated pressure-sensitive adhesive sheet preferably has high transparency. The double-coated pressure-sensitive adhesive sheet may have a haze of preferably 2% or less, and more preferably 1% or less, as measured in conformance with JIS K 7136. The double-coated pressure-sensitive adhesive sheet, when having a haze of 2% or less, may allow an adherend optical product or optical member to have satisfactory transparency and a good appearance even after the sheet is applied thereto.

Though not critical, the double-coated pressure-sensitive adhesive sheet may have a total luminous transmittance of preferably 85% or more, and more preferably 90% or more. The total luminous transmittance is a total luminous transmittance at wavelengths in the visible light region as measured in conformance with JIS K 7361-1. The double-coated pressure—sensitive adhesive sheet, when having a total luminous transmittance of 85% or more, may allow an adherend optical product or optical member to have satisfactory transparency and a good appearance even after the sheet is applied thereto.

The haze and total luminous transmittance may be measured with a hazemeter typically after laminating the double-coated pressure-sensitive adhesive sheet to a glass plate. Specifically, the haze and total luminous transmittance may be measured according to the following method.

Method for Measurement of Haze and Total Light Transmittance

One release film (e.g., "MRN #38," Mitsubishi Plastics, Inc.) is removed from a sample double-coated pressure-sensitive adhesive sheet to expose one adhesive face, and the exposed adhesive face of the double-coated pressure-sensitive adhesive sheet is applied to a glass plate (e.g., trade name "Slide Glass S111," Matsunami Glass Ind., Ltd., having a thickness of 1.0 mm and a haze of 0.1%), and the other release film (e.g., "MRF #38," Mitsubishi Plastics, Inc.) is removed to give a test piece. The test piece is subjected to measurements of haze (%) and total luminous transmittance (%) in conformance with JIS K 7136 and JIS K 7361-1, respectively, using a hazemeter (e.g., device name "HM-150," Murakami Color Research Laboratory).

The double-coated pressure-sensitive adhesive sheet preferably has satisfactory reworkability at a low temperature. The double-coated pressure-sensitive adhesive sheet is preferably a removable double-coated pressure-sensitive adhesive sheet which is removable from adherends and enables reuse of the adherends even after the adherends are once bonded to each other through the double-coated pressure-sensitive adhesive sheet and then removed (detached) from each other.

Though not limited, the reworkability may be evaluated by the following delamination test.

Delamination Test

One adhesive face of the double-coated pressure-sensitive adhesive sheet (size: 26 mm long by 30 mm wide) is affixed to a surface of the following adherend A, and the other adhesive face is affixed to a surface of the following adherend B to yield a test piece having a structure of (adherend A)/(double-coated pressure-sensitive adhesive sheet)/(adherend B). Next, the test piece is placed in an autoclave, followed by autoclave treatment at a temperature of 50° C. and a pressure of 5 atmospheres for 15 minutes. The treated test piece is left stand at an ambient temperature of −30° C. for 30 minutes and subjected to a delamination test at an ambient temperature of −30° C., in which the adherend A is fixed and the adherend B is pulled in a thickness direction to detach the adherend B from the adherend A. A maximum load upon detachment of the adherend B from the adherend A is measured and defined as an adhesive strength (N) at −30° C.

The adherend B may be detached at a tensile speed of preferably 10 to 1000 mm/min, and more preferably 100 to 500 mm/min. As used herein the term "thickness direction" refers to a direction perpendicular typically to a surface 100 mm long by 50 mm wide of the adherend A.

The adherend A is a glass plate (Matsunami Glass Ind., Ltd.; thickness: 0.7 mm, size: 100 mm long by 50 mm wide). The adherend B is a glass slide (Matsunami Glass Ind., Ltd.; thickness: 1.0 mm, size: 76 mm long by 26 mm wide). More specifically, the reworkability may be evaluated by a test according to the procedure described in "Detaching Method B" in after mentioned working examples.

In an embodiment, the double-coated pressure-sensitive adhesive sheet may allow the adherend A and the adherend B to be detached (delaminated) from each other in the delamination test. In a preferred embodiment, the double-coated pressure-sensitive adhesive sheet may allow the adherend A and the adherend B to be detached from each other without fracture or breakage in the delamination test.

Though not critical, the double-coated pressure-sensitive adhesive sheet may have an adhesive strength at −30° C. of preferably less than 20 N (e.g., 3 N or more and less than 20 N), more preferably 18 N or less, furthermore preferably 15 N or less, and particularly preferably less than 12 N (e.g., 5 or more and less than 12 N) as measured in the delamination test. The double-coated pressure-sensitive adhesive sheet, when having an adhesive strength at −30° C. of less than 20 N, may have a lower adhesive strength and help adherends to be detached more easily at a low temperature (about −60° C. to about 20° C.). The double-coated pressure-sensitive adhesive sheet preferably has an adhesive strength at −30° C. within the above-specified range even when any of the two adhesive faces is applied to the adherend A.

Though not critical, the double-coated pressure-sensitive adhesive sheet may have a 180-degree peel strength at room temperature (23° C.) of preferably 2.0 N/20 mm or more (e.g., 2.0 to 50 N/20 mm), more preferably 2.5 N/20 mm or more (e.g., 2.5 to 40 N/20 mm), furthermore preferably 4.0 N/20 mm or more (e.g., 4.0 to 30 N/20 mm), and still more preferably 6.0 N/20 mm or more (e.g., 6.0 to 20 N/20 mm). The 180-degree peel strength herein is an adhesive strength upon 180 degree peeling as measured with respect to glass at a tensile speed of 300 mm/min and at a temperature of 23° C. The double-coated pressure-sensitive adhesive sheet may have a 180-degree peel strength at room temperature (23° C.) within the above-specified range preferably on at least one adhesive face and more preferably on both adhesive faces. The 180-degree peel strength at room temperature (23° C.) may be measured typically according to the following method.

Method for Measurement of 180-degree Peel Strength at Room Temperature (23° C.)

A sheet specimen (e.g., sheet specimen of 100 mm long and 20 mm wide) is cut out from the double-coated pressure-sensitive adhesive sheet, one release film (e.g., "MRN #38," Mitsubishi Plastics, Inc.) is removed from the sheet specimen to expose one adhesive face, the exposed adhesive face (opposite side to a side to be measured) is lined with a PET film (e.g., "LUMIRROR S-10," Toray Industries Inc., 50 μm thick), and yields a strip sheet specimen.

Next, the other release film (e.g., "MRF #38," Mitsubishi Plastics, Inc.) is removed from the strip sheet specimen to expose the other adhesive face (side to be measured), and the exposed other adhesive face is bonded to a glass plate (e.g., Matsunami Glass Ind., Ltd., 0.7 mm thick) through compression bonding by one reciprocating movement of a 2-kg roller at an ambient temperature of 23° C. to give a measurement sample.

The measurement sample is left stand at an ambient temperature of 23° C. and 50% relative humidity for 30 minutes, subjected to a 180-degree peel test using a tensile tester to measure a 180-degree peel strength (adhesive strength upon 180-degree peeling) (N/20 mm) with respect to glass. The measurement is performed in an environment of a temperature of 23° C. and 50% relative humidity at a peel angle of 180 degrees and a tensile speed of 300 mm/min.

In a preferred embodiment, the double-coated pressure-sensitive adhesive sheet has an adhesive strength at −30° C. of less than 20 N (e.g., 3 N or more and less than 20 N, more preferably 5 to 12 N) and has a 180-degree peel strength at 23° C. of 2.0 N/20 mm or more (e.g., 2.0 to 50 N/20 mm, more preferably 2.5 to 40 N/20 mm, and furthermore preferably 4.0 to 30 N/20 mm) on at least one adhesive face as measured with respect to glass at a tensile speed of 300 mm/min.

EXAMPLES

The present invention will be illustrated in further detail with reference to several working examples below. It should be noted, however, that these examples are never intended to limit the scope of the present invention.

Example 1

A mixture (monomer component) of 75 parts by weight of lauryl acrylate (LA), 19 parts by weight of methyl acrylate (MA), and 6 parts by weight of N-vinyl-2-pyrrolidone (NVP) was placed in a four-necked flask, combined with photoinitiators, i.e., 0.05 part by weight of 1-hydroxycyclohexyl phenyl ketone (trade name "IRGACURE 184," BASF JAPAN LTD.) and 0.05 part by weight of 2,2-dimethoxy-1,2-diphenylethan-1-one (trade name "IRGACURE 651,"

BASF JAPAN LTD.), irradiated with an ultraviolet ray under a nitrogen atmosphere for photopolymerization so as to have a viscosity of about 15 Pa·s, and thereby yielded a partially polymerized monomer syrup (partial polymer of the monomer component). The viscosity was measured with a BH type rotational viscometer using a No. 5 rotor at a rate of 10 rpm and at a temperature of 30° C.

The partially polymerized monomer syrup (100 parts by weight) was uniformly mixed with 0.05 part by weight of 1,6-hexanediol diacrylate (HDDA, multifunctional monomer) and photoinitiators (additional polymerization initiators), i.e. 0.05 part by weight of 1-hydroxycyclohexyl phenyl ketone (trade name "IRGACURE 184," BASF JAPAN LTD.) and 0.05 part by weight of 2,2-dimethoxy-1,2-diphenylethan-1-one (trade name "IRGACURE 651," BASF JAPAN LTD.), and yielded a pressure-sensitive adhesive composition.

The pressure-sensitive adhesive composition was applied to a releasably-treated surface of a release film ("MRF #38," Mitsubishi Plastics, Inc.) to a thickness of 175 µm to form a pressure-sensitive adhesive layer thereon. Next, an exposed surface (the other surface) of the pressure-sensitive adhesive layer was laminated to a releasably-treated surface of a release film ("MRN #38," Mitsubishi Plastics, Inc.), the resulting article was irradiated with an ultraviolet ray at an intensity of 4 mW/cm$^2$ and a dose (light quantity) of 1200 mJ/cm$^2$ and yielded a double-coated pressure-sensitive adhesive sheet I.

A sheet specimen (size: 100 mm long by 50 mm wide) was cut from the double-coated pressure-sensitive adhesive sheet I, one release film (MRN #38) was removed from the cut sheet specimen to expose one adhesive face, and the exposed adhesive face was affixed to a glass plate (a) (Matsunami Glass Ind., Ltd., 0.7 mm thick, size: 100 mm long by 50 mm wide), the other release film (MRF #38) was removed to expose the other adhesive face, and the exposed other adhesive face was affixed to a glass plate (b) (Matsunami Glass Ind., Ltd., 0.7 mm thick, size: 100 mm long by 50 mm wide), and yielded a detachment-testing sample I having a structure of (glass plate (a))/(double-coated pressure-sensitive adhesive sheet I)/(glass plate (b)).

The detachment-testing sample I was subjected to detachment by the following detaching method A. FIG. 1 is an explanatory drawing illustrating the detaching method A.

Detaching Method A

The detachment-testing sample I was placed in an autoclave, followed by autoclave treatment at a temperature of 50° C. and a pressure of 5 atmospheres for 15 minutes. The detachment-testing sample I after the autoclave treatment was retrieved from the autoclave and left stand at a temperature of −40° C. for one hour. Next, while holding the temperature (detaching temperature) to −40° C., a head of chisel 4 (Yoita Riki Kogyo K.K., product name: YOSHIHIRO Tool Chisel, Type: flat, size: 30 mm) was inserted into a boundary 5 between the glass plate (a) 11 and the double-coated pressure-sensitive adhesive sheet 2 in a direction in parallel with the glass plate (a) 11 (FIGS. 1a and 1b) and thereby the glass plate (a) 11 and the glass plate (b) 31 were detached from each other at the boundary 5 between the glass plate (a) 11 and the double-coated pressure-sensitive adhesive sheet 2 (FIG. 1c).

Figure 5:
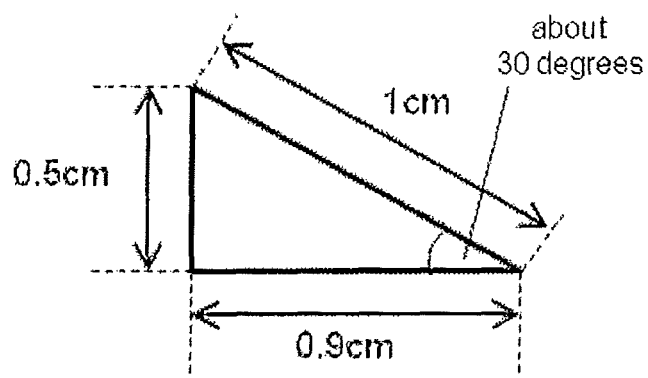
FIG. 5 depicts a cross-sectional view of a wedge-shaped head of a chisel used in working examples.
Figure 6:
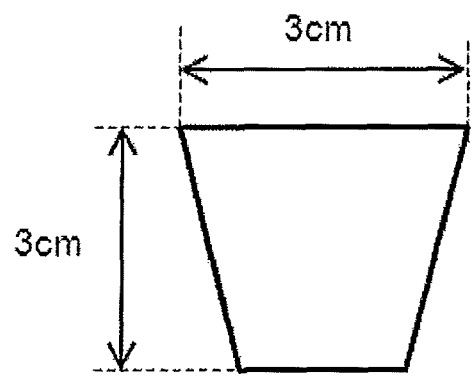
FIG. 6 is a plan view of the wedge-shaped head of the chisel used in the working examples.

FIGS. 5 and 6 are a cross-sectional view and a plan view, respectively, of an edge (wedge-shaped head) of the chisel used in the detaching method A.

Example 2

A double-coated pressure-sensitive adhesive sheet II was prepared by the procedure of Example 1, except for using monomers of different types in different amounts as given in Table 1 to constitute a monomer component. Except for using the double-coated pressure-sensitive adhesive sheet II, a detachment-testing sample II was prepared by the procedure of Example 1. The detachment-testing sample II had a structure of (glass plate (a))/(double-coated pressure-sensitive adhesive sheet II)/(glass plate (b)).

The detachment-testing sample II was subjected to detachment by the detaching method A.

Example 3

The detachment-testing sample II was subjected to detachment by the procedure of Example 2, except for leaving the detachment-testing sample II for one hour after retrieval from the autoclave, and performing detachment both at a temperature of −30° C.

Example 4

A double-coated pressure-sensitive adhesive sheet IV was prepared by the procedure of Example 1, except for using monomers of different types in different amounts as given in Table 1 to constitute a monomer component.

FIG. 2 is an explanatory drawing (plan view) illustrating the detachment-testing sample used in Example 4; and FIG. 3 is an explanatory drawing (cross-sectional view taken along the line A-A in FIG. 2) illustrating the detachment-testing sample used in Example 4, on which a kite string was hooked.

A sheet specimen (size: 30 mm long by 26 mm wide) was cut from the double-coated pressure-sensitive adhesive sheet IV and used for detachment after removal of the release films therefrom.

A glass plate (c) 12 (Matsunami Glass Ind., Ltd., 0.7 mm thick, size: 100 mm long by 50 mm wide) and a glass slide (d) 32 (Matsunami Glass Ind., Ltd., 1.0 mm thick, size: 76 mm long by 26 mm wide) were laminated to each other through the sheet specimen in the following manner and thereby yielded a detachment-testing sample IV as illustrated in FIGS. 2 and 3. The glass slide (d) 32 has a kite-string-pulling part 33 extending in a width direction at a position of 55 mm from the laminated end (FIGS. 2 and 3).

Specifically, one release film (MRN #38) was removed from the cut sheet specimen to expose one adhesive face, the exposed adhesive face was affixed to the glass slide (d) 32, the other release film (MRF #38) was removed to expose the other adhesive face, the exposed adhesive face was affixed to the glass plate (c) 12, and thereby yielded a detachment-testing sample IV having a structure of (glass plate (c))/(double-coated pressure-sensitive adhesive sheet IV)/(glass slide (d)).

The detachment-testing sample IV was subjected to detachment by the following detaching method B.

Detaching Method B

The detachment-testing sample IV was placed in an autoclave, followed by autoclave treatment at a temperature of 50° C. and a pressure of 5 atmospheres for 15 minutes. The detachment-testing sample IV after the autoclave treatment was retrieved from the autoclave and left stand at a temperature of −10° C. for 30 minutes. Next, a kite string 6 was hooked on the kite-string-pulling part 33 of the glass slide (d) 32 as illustrated in FIGS. 2 and 3. The glass plate (c) 12 was fixed to a tensile tester using a metal jig, and the kite string 6 was pulled using the tensile tester in a direction (tensile direction illustrated in FIG. 3) perpendicular to the surface of the glass slide (d) 12 at a temperature (detaching temperature) of −10° C., at a tensile speed of 300 mm/min to detach the glass plate (c) 12 and the glass slide (d) 32 from each other.

Example 5

A double-coated pressure-sensitive adhesive sheet V was prepared by the procedure of Example 1, except for using monomers of different types in different amounts as given in Table 1 to constitute a monomer component. Except for using the double-coated pressure-sensitive adhesive sheet V, a detachment-testing sample V having a structure of (glass plate (c))/(double-coated pressure-sensitive adhesive sheet V)/(glass slide (d)) was prepared by the procedure of Example 4.

The detachment-testing sample V was subjected to detachment according to the detaching method B by the procedure of Example 4, except for leaving detachment-testing sample V after retrieval from the autoclave for 30 minutes and performing the detachment of the sample both at a temperature of −30° C.

Example 6

A double-coated pressure-sensitive adhesive sheet VI was prepared by the procedure of Example 1, except for using monomers of different types in different amounts as given in Table 1 to constitute a monomer component. Except for using the double-coated pressure-sensitive adhesive sheet VI, a detachment-testing sample VI having a structure of (glass plate (c))/(double-coated pressure-sensitive adhesive sheet VI)/(glass slide (d)) was prepared by the procedure of Example 4.

The detachment-testing sample VI was subjected to detachment according to detaching method B by the procedure of Example 4, except for or leaving detachment-testing sample VI after retrieval from the autoclave for 30 minutes and performing the detachment of the sample both at a temperature of −50° C.

Example 7

A double-coated pressure-sensitive adhesive sheet VII was prepared by the procedure of Example 1, except for using monomers of different types in different amounts as given in Table 1 to constitute a monomer component.

FIG. 4 is a cross-sectional view illustrating a detachment-testing sample used in Example 7.

A sheet specimen (size: 125 mm long by 220 mm wide) was cut from the double-coated pressure-sensitive adhesive sheet VII, one release film (MRN #38) was removed from the cut sheet specimen to expose one adhesive face, the exposed adhesive face was affixed to a glass plate (e) (Matsunami Glass Ind., Ltd., thickness 0.55 mm, size: 125 mm long by 220 mm wide), the other release film (MRF #38) was removed to expose the other adhesive face, and the exposed adhesive face was laminated to a glass plate (f) (Matsunami Glass Ind., Ltd., thickness 0.55 mm, size: 125 mm long by 220 mm wide) with a hand roller, the resulting article was pressed with a press machine at a contact pressure of 0.1 MPa, at a degree of vacuum of 30 Pa for 17 seconds, and the pressed article was placed in an autoclave, followed by autoclave treatment at a temperature of 50° C. and a pressure of 5 atmospheres for 15 minutes. Independently, two plied of a fixing pressure-sensitive adhesive sheet 7 were prepared in a manner below, from which one release film (MRN #38) was removed to expose one adhesive face, and the exposed adhesive faces (two plies) were affixed to a glass plate (e) 13 and a glass plate (f) 34, respectively, the other release film (MRF #38) was removed to expose the other adhesive face, and the exposed adhesive faces (two plies) were affixed to acrylic plates 8 (Mitsubishi Rayon Co., Ltd., thickness 2 mm, size: 200 mm long by 300 mm wide), and thereby yielded a detachment-testing sample VII having a structure of (acrylic plate (holding plate))/(fixing pressure-sensitive adhesive sheet)/(glass plate (e))/(double-coated pressure-sensitive adhesive sheet VII)/(glass plate (f))/(fixing pressure-sensitive adhesive sheet)/(acrylic plate (holding plate)) as illustrated in FIG. 4.

Next, the detachment-testing sample VII was left stand at a temperature of −30° C. for one hour. The glass plate (e) 13 and the glass plate (f) 34 were pulled respectively in a direction normal to each glass plate to detach the glass plate (e) 13 and the glass plate (f) 34 from each other.

Method for Preparation of Fixing Pressure-sensitive Adhesive Sheet

A mixture of 94 parts by weight of 2-ethylhexyl acrylate (2EHA) and 6 parts by weight of acrylic acid (AA) was placed in a four-necked flask, combined with photoinitiators, i.e., 0.05 part by weight of 1-hydroxycyclohexyl phenyl ketone (trade name "IRGACURE 184," BASF JAPAN LTD.) and 0.05 part by weight of 2,2-dimethoxy-1,2-diphenylethan-1-one (trade name "IRGACURE 651," BASF JAPAN LTD.), irradiated with an ultraviolet ray under a nitrogen atmosphere for polymerization so as to have a viscosity of about 15 Pa·s, and yielded a partially polymerized monomer syrup (partial polymer of the monomer component). The viscosity was measured with a BH type rotational viscometer using a No. 5 rotor at a rate of 10 rpm, at a temperature of 30° C.

The partially polymerized monomer syrup (100 parts by weight) was combined with 0.3 part by weight of 1,6-hexanediol diacrylate (HDDA, multifunctional monomer) and yielded a pressure-sensitive adhesive composition.

The pressure-sensitive adhesive composition was applied to a releasably-treated surface of a release film ("MRF #38," Mitsubishi Plastics, Inc.) to a thickness of 50 μm to form a fixing pressure-sensitive adhesive layer thereon. Next, the other surface (exposed adhesive face) of the fixing pressure-sensitive adhesive layer was laminated to a releasably-treated surface of a release film ("MRN #38," Mitsubishi Plastics, Inc.), the resulting article was irradiated with an ultraviolet ray at an intensity of 4 mW/cm$^2$ and a dose of 1200 mJ/cm$^2$ to photocure the fixing pressure-sensitive adhesive layer, and thereby yielded a fixing pressure-sensitive adhesive sheet.

Comparative Example 1

The detachment-testing sample II was subjected to detachment by the procedure of Example 2, except for leaving detachment-testing sample II for one hour after retrieval from the autoclave and performing the detachment of the sample both at a temperature of −10° C.

Comparative Example 2

The detachment-testing sample II was subjected to detachment by the procedure of Example 2, except for leaving detachment-testing sample II for one hour after retrieval from the autoclave and performing the detachment of the sample both at a temperature of 23° C.

Evaluations

The double-coated pressure-sensitive adhesive sheets and detachment-testing samples obtained in the examples and comparative examples were examined on gel fraction, storage elastic modulus at the detaching temperature, storage elastic modulus at 23° C., and detachment result.

(1) Gel Fraction (%)

A gel fraction (%) was measured according to the "method for gel fraction measurement."

(2) Storage Elastic Modulus (Pa) at Detaching Temperature

Plural plies of each of the double-coated pressure-sensitive adhesive sheets obtained in the examples and comparative examples were laminated to a thickness of about 2 mm to give measurement samples. A storage elastic modulus (Pa) of each measurement sample at a detaching temperature was measured with the "Advanced Rheometric Expansion System (ARES)" (Rheometric Scientific F. E. Ltd. (now TA Instruments)) at a frequency of 1 Hz, at temperatures rising from −60° C. to 100° C. at a rate of temperature rise of 5° C./rain.

The "detaching temperature" as above refers to a temperature given in Table 1.

(3) Storage Elastic Modulus at 23° C. (Storage Elastic Modulus (23° C.))

A storage elastic modulus (23° C.) (Pa) was measured by the procedure of (2).

(4) Detachment Result

Glass plates (or glass slides) of the detachment-testing samples after detachment according to the respective detaching methods (detaching methods A, B, and C) in the examples and comparative examples were visually observed, and how they were detached was evaluated according to the following criteria:

Good: Good detachment in which the glass plate (glass slide) was detached without breakage and with less adhesive deposit;

Failure: Detachment failure in which the glass plate (glass slide) was broken

TABLE 1

|  |  | Example 1 | Example 2 | Example 3 | Example 4 | Example 5 | Example 6 | Example 7 | Com. Ex. 1 | Com. Ex. 2 |
|---|---|---|---|---|---|---|---|---|---|---|
| Monomer component (part by weight) | LA | 75 | 84 | 84 | 100 | 75 | 47 | 75.5 | 84 | 84 |
|  | MA | 19 |  |  |  | 19 | 47 | 18.9 |  |  |
|  | IBXA |  | 10 | 10 |  |  |  |  | 10 | 10 |
|  | NVP | 6 | 6 | 6 |  | 6 | 6 | 6 | 6 | 6 |
|  | HDDA | 0.05 | 0.04 | 0.04 | 0.01 | 0.05 | 0.05 | 0.04 | 0.04 | 0.04 |
| Detaching method |  | A | A | A | B | B | B | C | A | A |
| Detaching temperature (° C.) |  | −40 | −40 | −30 | −10 | −30 | −50 | −30 | −10 | 23 |
| Gel fraction (%) |  | 62.2 | 67.8 | 67.8 | 69.2 | 62.2 | 63.1 | 52.0 | 67.8 | 67.8 |
| Storage elastic modulus (Pa) at detaching temperature |  | $8.39 \times 10^8$ | $9.05 \times 10^8$ | $2.71 \times 10^8$ | $6.17 \times 10^7$ | $1.68 \times 10^8$ | $5.88 \times 10^8$ | $3.84 \times 10^8$ | $1.81 \times 10^6$ | $3.66 \times 10^4$ |
| Detachment result |  | Good | Good | Good | Good | Good | Good | Good | Failure | Failure |
| Storage elastic modulus (Pa) (23° C.) |  | $6.32 \times 10^4$ | $3.66 \times 10^4$ | $3.66 \times 10^4$ | $1.99 \times 10^4$ | $6.32 \times 10^4$ | $1.41 \times 10^5$ | $4.48 \times 10^4$ | $3.66 \times 10^4$ | $3.66 \times 10^4$ |

Monomer components are abbreviated as follows in Table 1.

LA: Lauryl acrylate

MA: Methyl acrylate

IBXA: Isobornyl acrylate

NVP: N-Vinyl-2-pyrrolidone

HDDA: 1,6-Hexanediol diacrylate

The results in Table 1 demonstrate as follows. The detaching methods according to Examples 1 to 7 enabled detachment of glass plates with less adhesive deposit on the glass plates (or glass slides) after detachment without breakage of the glass plates (or glass slides). The detaching methods according to Comparative Examples 1 and 2 resulted in breakage of glass plates.

REFERENCE SIGNS LIST

11 glass plate (a)
12 glass plate (c)
13 glass plate (e)
2 double-coated pressure-sensitive adhesive sheet
31 glass plate (b)
32 glass slide (d)
33 kite-string-pulling part
34 glass plate (f)
4 head of chisel
5 boundary between double-coated pressure-sensitive adhesive sheet and glass plate (a)
6 kite string
7 fixing pressure-sensitive adhesive sheet
8 acrylic plate While preferred embodiments of the present invention have been described using specific terms, such description is for illustrating purposes only, and it is to be understood that various changes and modifications may be made without departing from the spirit and scope of the present invention as defined in the appended claims.

The invention claimed is:

1. A method of detaching two plates bonded through a double-coated pressure-sensitive adhesive sheet, the method comprising a step of applying a force to at least one of the two plates at least in a linear direction perpendicular to a surface of the plate to which the double-coated pressure-sensitive adhesive sheet is applied at such a temperature that the double-coated pressure-sensitive adhesive sheet has a storage elastic modulus of $1.0 \times 10^7$ Pa or more by dynamic viscoelastic measurement, wherein the detaching temperature is from −60° C. to 0° C.

2. The method of claim 1, wherein the double-coated pressure-sensitive adhesive sheet has a storage elastic modulus of $1.0 \times 10^6$ Pa or less at 23° C. by dynamic viscoelastic measurement.

3. The method of claim 2, wherein the step of applying the force includes;

preparing a tool having at least a wedge-shaped head; and
inserting a tapered thin edge of the wedge-shaped head of the tool between the two plates from a lateral side of the double-coated pressure-sensitive adhesive sheet.

4. The method of claim 2, wherein the double-coated pressure-sensitive adhesive sheet comprises a pressure-sensitive adhesive layer formed from a pressure-sensitive adhesive composition including an acrylic polymer of a monomer component, or a partial polymer of the monomer component, and wherein the monomer component comprises a (meth) acrylic alkyl ester whose alkyl moiety being a linear or branched-chain alkyl group having 10 to 13 carbon atoms.

5. The method of claim 1, wherein the step of applying the force includes;

preparing a tool having at least a wedge-shaped head; and
inserting a tapered thin edge of the wedge-shaped head of the tool between the two plates from a lateral side of the double-coated pressure-sensitive adhesive sheet.

6. The method of claim 5, wherein the double-coated pressure-sensitive adhesive sheet comprises a pressure-sensitive adhesive layer formed from a pressure-sensitive adhesive composition including an acrylic polymer of a monomer component, or a partial polymer of the monomer component, and wherein the monomer component comprises a (meth) acrylic alkyl ester whose alkyl moiety being a linear or branched-chain alkyl group having 10 to 13 carbon atoms.

7. The method of claim 1, wherein the double-coated pressure-sensitive adhesive sheet comprises a pressure-sensitive adhesive layer formed from a pressure-sensitive adhesive composition including an acrylic polymer of a monomer component, or a partial polymer of the monomer component, and wherein the monomer component comprises a (meth) acrylic alkyl ester whose alkyl moiety being a linear or branched-chain alkyl group having 10 to 13 carbon atoms.

8. The method of claim 1, wherein an adhesive strength at −30° C. measured in a delamination test is less than 20N, wherein the delamination test contains following steps:

affixing one adhesive face of the double-coated pressure-sensitive adhesive sheet to a surface of a glass plate, and the other adhesive face is affixed to a surface of a glass slide to yield a test piece having a structure of (glass plate)/(double-coated pressure-sensitive adhesive sheet)/(glass slide);

placing the test piece in an autoclave, followed by autoclave treatment at a temperature of 50° C. and a pressure of 5 atmospheres for 15 minutes;

leaving the treated test piece stand at an ambient temperature of −30° C. for 30 minutes;

at the temperature of −30° C., fixing the glass plate and pulling the glass slide in a thickness direction to detach the glass slide from the glass plate; and measuring a maximum load upon detachment of the glass slide from the glass plate wherein the maximum load is defined as the adhesive strength (N) at −30° C.

\* \* \* \* \*